Patented Feb. 20, 1945

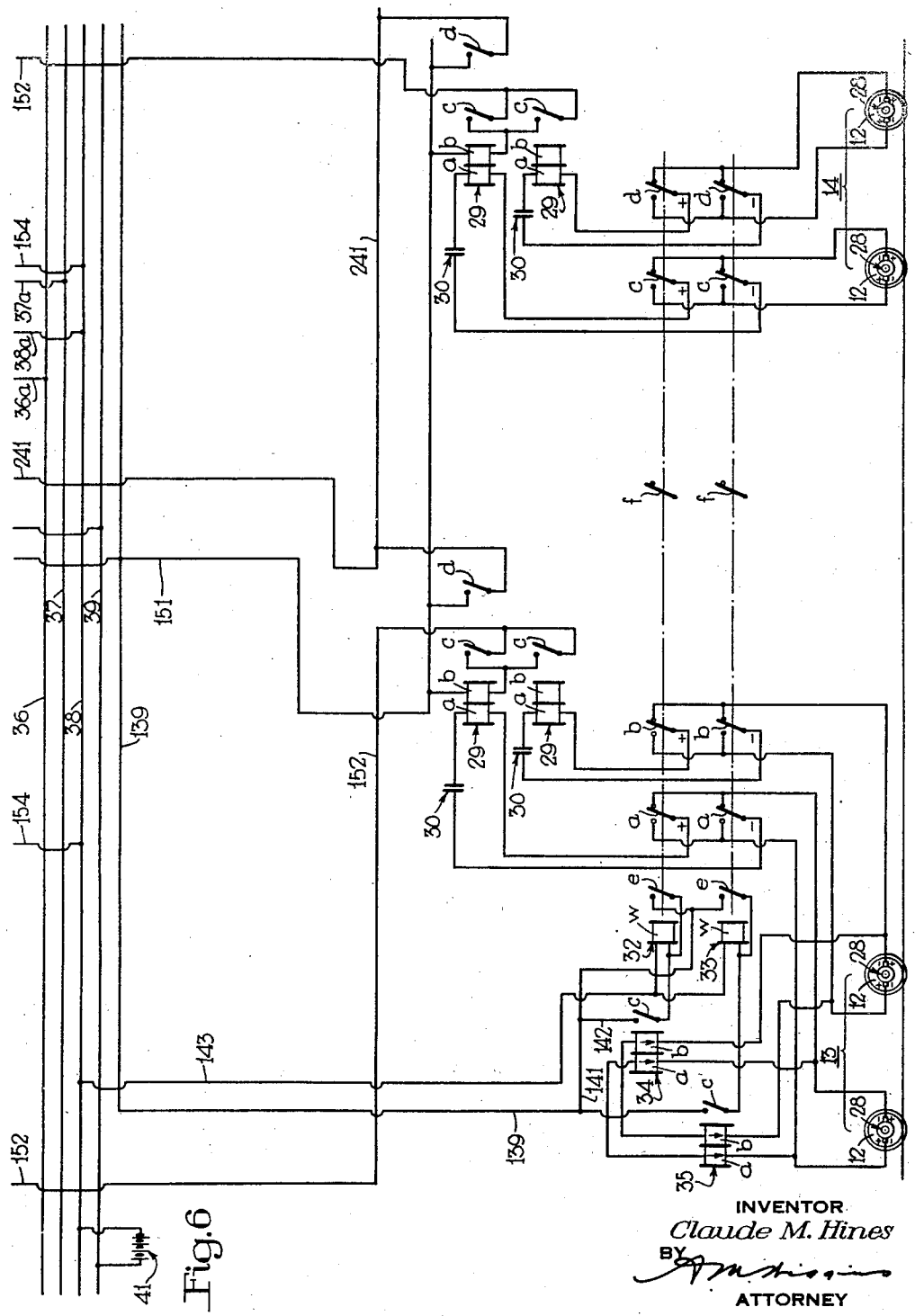

2,369,968

UNITED STATES PATENT OFFICE 2,369,968

BRAKE CONTROL SYSTEM

Claude M. Hines, Pittsburgh, Pa., assignor to The Westinghouse Air Brake Company, Wilmerding, Pa., a corporation of Pennsylvania Application August 29, 1942, Serial No. 456,638

37 Claims. (Cl. 303—21)

This invention relates to brake control systems for railway cars and trains and has particular relation to brake control systems having means automatically responsive to slipping of individual car wheel units to effect a rapid reduction in the degree of application of the brakes associated with the slipping wheel unit whereby to cause restoration of the slipping wheel unit back to car speed before the wheel unit can decelerate to a locked condition and slide.

The terms "slipping" or "slipping condition" and "sliding" or "sliding condition" as applied to car wheels herein are not synonymous but have different meanings. The term "slipping" or "slipping condition" refers to the rotation of a car wheel at a speed less than or greater than a speed corresponding to car speed at a given instant and produced in response to a braking effect or a propulsion torque respectively exerted on the wheel to a degree sufficient to exceed the adhesion between the wheel and the rail surface. In the present application the slipping condition of a car wheel produced in response to excessive braking effect will be principally dealt with.

It is a well known fact that when the braking effect exerted on a car wheel is sufficient to exceed the adhesion between the wheel and the rail, the wheel decelerates at an abnormally rapid rate toward a locked condition. The rotative deceleration of a car wheel at a rate exceeding a certain rate such as ten miles per hour per second which does not occur unless the wheel is slipping is accordingly positive indication of the slipping condition of the wheel. Various types of devices, both mechanical and electrical, have been devised for detecting the slipping condition of a car wheel on this principle.

If the degree of application of the brakes associated with a car wheel that begins to slip is reduced rapidly and to a sufficient degree, the slipping car wheel ceases to decelerate and promptly accelerates at an abnormally rapid rate, of the same order of magnitude as the rate of deceleration during slipping, back toward a speed corresponding to car speed without reducing in speed to a locked condition. Various types of brake control equipments have been heretofore devised employing wheel-slip detectors of various types for the purpose of controlling the brakes in this manner and thereby preventing the sliding of the car wheels. The terms "sliding" or "sliding condition" are employed herein to designate the dragging of a car wheel along a rail in a locked condition and are therefore, as intimated above, distinct in meaning from the terms "slipping" or "slipping condition."

Sliding of car wheels is objectionable for the reason that the degree of braking effect exerted on a car by a slipping wheel is less than that by a non-slipping or rolling wheel. Moreover, sliding of a car wheel produces flat spots thereon necessitating repair or replacement of the wheel which is an item of maintenance to be avoided.

The earlier types of the brake control equipment heretofore devised for preventing the sliding of car wheels, permit the restoration of the same degree of brake application on a slipping wheel after its restoration to car speed as that which produced the slipping condition, thus rendering likely a plurality of successive slipping cycles during any given brake application.

It was later proposed to provide means whereby the reapplication of the brakes on a slipping wheel would be effected at a restricted rate thereby minimizing the possibility of repeated slipping cycles. The inherent delay in the restoration of an appreciable degree of brake application on a slipping wheel involves, however, a penalty in the form of increased stopping distance.

An alternative proposal to the restricted rate of reapplication of the brakes on slipping wheels was to provide means for automatically causing the reapplication of the brakes on a slipping wheel to be limited to a degree having a certain fixed relation, such as 75% to the degree of the brake application in effect at the time slipping of the wheel was initiated. Such an equipment is disclosed in Patent No. 2,140,620 of Clyde C. Farmer. This proposal is advantageous over the equipment having the restricted rate of reapplication of brakes on a slipping wheel in that it tends to produce shorter stopping distances.

However, there is a possibility that notwithstanding the reapplication of brakes to a reduced degree on slipping wheels, in the manner proposed in the Farmer patent, a continued bad rail or low adhesion condition might nevertheless produce a second slipping cycle. In such case, the Farmer equipment is ineffective to produce any further automatic reduction in the degree of reapplication of the brakes. In other words, the equipment in the Farmer patent is inherently limited to effecting but one reduction in the limit of reapplication of the brakes and cannot effect any automatic reduction in the limit of brake reapplication with succeeding slipping cycles after the first slipping cycle during any given brake application.

It is accordingly an object of my present invention to provide a brake control system for railway cars and trains of the type having means responsive to the slipping of the car wheels to effect reduction in the degree of application of the brakes associated with the slipping wheels and further characterized by an arrangement whereby the degree of reapplication of the brakes on the slipping wheels following each of a plurality of slipping cycles during a given brake application is automatically limited to a lesser value than the degree existing prior to the slipping cycle.

My invention is accordingly effective to more positively insure against repeated slipping cycles during any given brake application because it causes the degree of application of the brakes following each slipping cycle to be limited to a value less than that existing prior to the slipping cycle, so as to ultimately arrive at a degree of brake application which will not produce slipping of the car wheels when the brakes are reapplied thereon. The equipment comprising my invention accordingly tends to limit to a minimum the number of repeated slipping cycles during any given brake application and thereby inherently tends to shorten the stopping distance of the car or train with respect to the stopping distance of the car or train having brake control equipment in which an unlimited number of slipping cycles of the car wheels is permitted and as well to cause less consumption of fluid under pressure. Moreover, the wear on the rolling surfaces of the car wheels is minimized by reduction of the amount of slipping during brake application. It will be understood that while slipping of car wheels does not produce flat spots on the wheels, it nevertheless does cause more wear than occurs where the wheels roll in natural manner on a rail.

It is another object of my invention to provide a brake control system of the type indicated in the foregoing object wherein the arrangement for producing successive reductions in the degree of reapplication of the brakes includes stepping relays responsive to successive wheel slip cycles and effective to correspondingly condition the brake control equipment to control the degree of reapplication of the brakes.

It is another object of my invention to provide a brake control equipment of the type indicated in the first mentioned object and characterized by a novel pneumatic apparatus effective in response to each of a plurality of slipping cycles during any given brake application to effect a reduction of the degree of reapplication of the brakes on a slipping wheel below that existing prior to the slipping cycle.

It is another object of my invention to provide a brake control equipment of the type indicated in the first mentioned object and characterized by a novel arrangement for insuring proper operation of a wheel slip detector of the electric type.

The above objects, and other objects to my invention which will be made apparent hereinafter, are obtained in several embodiments to my invention subsequently to be described and shown in the accompanying drawings, wherein:

Figures 1 and 2, taken together, constitute a diagrammatic view showing a brake control equipment embodying my invention, Figures 3 and 4, taken together, constitute a diagrammatic view showing a second embodiment of my invention, Figures 5 and 6, taken together, constitute a diagrammatic view of a third embodiment of my invention, and Figure 7 is a diagrammatic simplified view showing a modification of the embodiment shown in Figs. 5 and 6.

DESCRIPTION OF EMBODIMENT SHOWN IN FIGS. 1 AND 2

(a) *Brief description of equipment*

While my invention may be employed in connection with any type of railway train brake control equipment, it is illustratively shown as applied to the railway train brake equipment of the fluid pressure type, commonly designated the Westinghouse "HSC" type with decelostat control. For convenience I have illustrated my invention only as applied to a car brake equipment, but it will be understood that it may also be applied to a locomotive brake equipment.

The "HSC" type of brake control equipment for railway cars and trains, to which my invention is illustratively applied, is shown in detail and described in Instruction Pamphlet No. 5064, Supplement 19, July 1941 edition, published by the Westinghouse Air Brake Company. Since reference may be had to this publication for complete details of the train brake equipment, the car brake equipment shown in the accompanying drawings will be described as briefly as possible consistent with an understanding of the invention.

Figure 1:
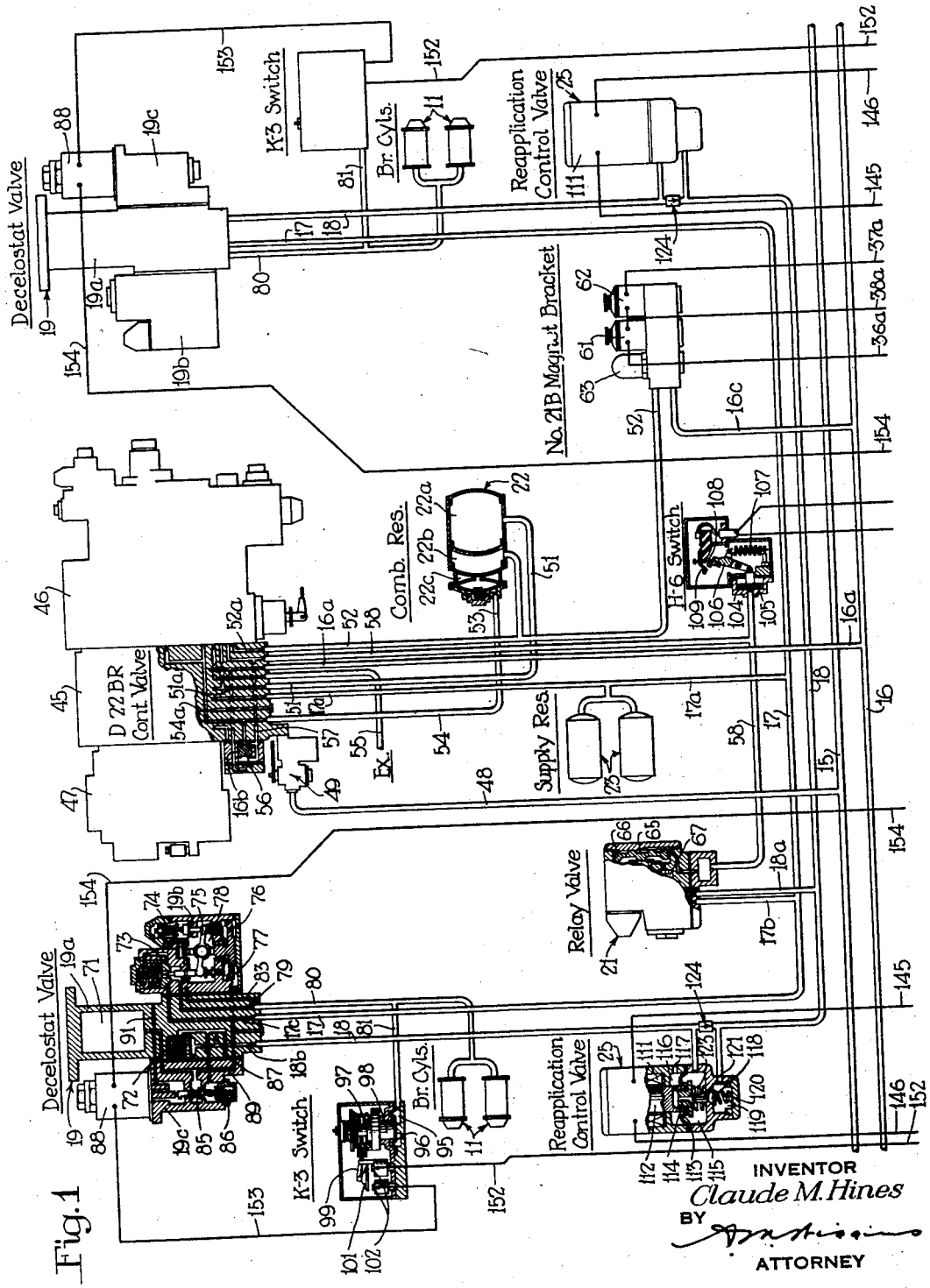
Figure 2:
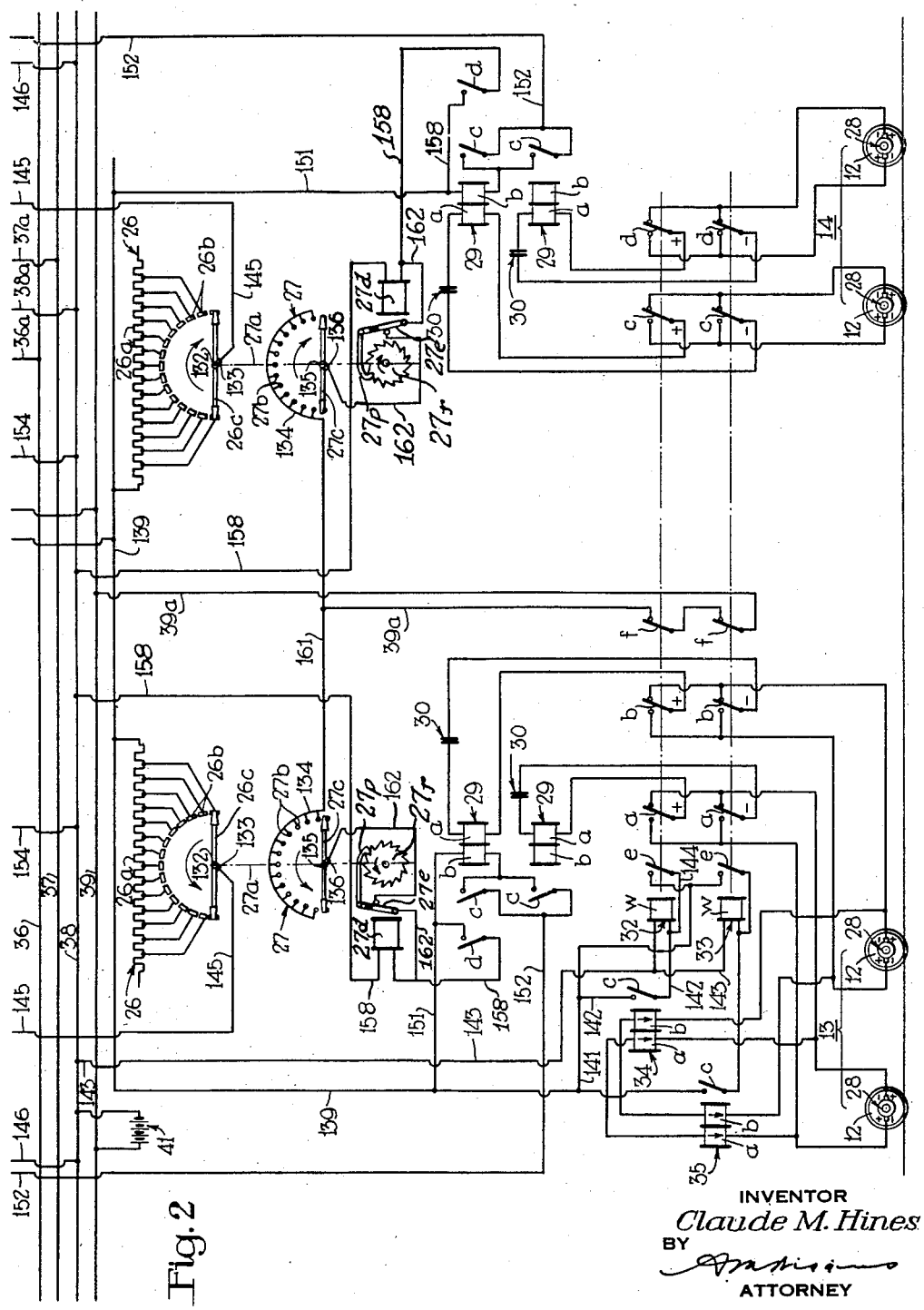

The car brake equipment shown in Figs. 1 and 2 comprises the usual brake cylinders 11 for applying and releasing the brakes on the wheels 12 of corresponding wheel trucks 13 and 14 located at opposite ends of the car respectively. The wheel trucks are shown as of the four-wheel type, comprising two wheel-and-axle assemblies, each assembly having two wheels fixed at opposite ends of a connecting axle. In the drawings, only one wheel of each assembly is shown.

The essential parts or elements of the conventional "HSC" car brake equipment of the type mentioned comprises two train pipes, hereafter referred to as the brake pipe 15 and the straight-air pipe 16, as well as two pipes local to each car and hereinafter respectively referred to as the supply reservoir pipe 17 and the decelostat valve pipe 18; a brake controlling valve device, specifically identified as the D22 BR control valve; a so-called decelostat valve 19 for each wheel truck; a relay valve device 21, a so-called 21—3 magnet bracket; a combination reservoir 22; two connected supply reservoirs 23; two pressure operated switches designated herein as K—3 switches, one associated with each corresponding one of the decelostat valves 19; and another type of pressure operated switch designated herein as the H—6 pressure switch.

According to my invention, a so-called reapplication control valve 25 is provided for each decelostat valve 19, each reapplication control valve controlled by a rheostat 26 operated by a corresponding stepping relay 27.

Each stepping relay 27 is controlled by wheel slip detecting apparatus of the electrical type.

The wheel slip detecting apparatus comprises a direct-current generator 28 for each wheel-and-axle assembly, the armature (rotor) of the generator being driven in accordance with the rotational speed of the wheels. The generators 28 are usually mounted at the outer end of the axle journal in a manner such that the armature shaft of the generator is coupled in coaxial relation to the end of the axle.

Associated with each generator 28 is a so-called decelostat relay 29 and an electrical condenser 30. The relays 29 are of the so-called unidirectional type having a pick-up winding $a$ and a holding winding $b$. The pick-up winding $a$ of each relay 29 is connected in series relation with the corresponding condenser 30 across the terminals of the corresponding generator 28 under the control of two cooperating reversing relays 32 and 33 referred to hereinafter as repeater relays.

Repeater relay 32 is controlled by a corresponding directional relay 34 and the repeater relay 33 is controlled by a corresponding directional relay 35. The directional relays 34 and 35 are, in turn, operatively controlled accordingly to the polarity of the voltage supplied by generators 28 associated with one of the wheel trucks, shown as the wheel truck 13.

The equipment further includes a plurality of train wires 36, 37, 38, and 39. The train wires 36 and 37 are employed in the control of the magnet windings of the No. 21B magnet bracket in the manner hereinafter more fully explained. The train wires 38 and 39 are connected to opposite terminals of a suitable source of direct-current, such as a storage battery 41. The wire 38 will hereinafter be designated the negative battery wire, and the wire 39 will be designated the positive battery wire. For simplicity, various control circuits hereinafter to be described will be traced starting from the positive battery wire and ending with the negative battery wire, this being tantamount to starting from the positive terminal of the battery 41 and ending with the negative terminal of the battery 41.

(b) *Detailed description of the equipment*

The D22 BR control valve comprises, briefly, a pipe bracket section 45, a service section 46, and an emergency section 47, sections 46 and 47 being secured to the opposite faces respectively of the pipe bracket section 45. The service and emergency sections 46 and 47 respectively comprise piston operated slide valve mechanisms (not visible) having piston chambers at one side of the pistons thereof which are both connected to a branch pipe 48 of the brake pipe 15 whereby operation thereof is effected in the usual manner in response to variation of the pressure in the brake pipe. The branch pipe 48 is connected to the pipe bracket section 45 through a combined dirt-collector and cutout cock 49.

The brake pipe 15 is normally charged in the usual manner to a normal pressure such as 110 pounds per square inch under the control of an automatic brake valve (not shown) of the M-40-A type. The brake valve is operative to effect service and emergency reductions of the pressure in the brake pipe to effect selectively the operation of the service section or both the service section and the emergency section of the D22 BR control valve.

As shown in Fig. 1, the combination reservoir 22 has formed therein three separate chambers or reservoirs, namely the emergency reservoir 22a, the auxiliary reservoir 22b, and the displacement volume 22c.

The emergency reservoir 22a is connected by a pipe 51 to the pipe bracket portion 45 and then through a passage 51a to the service and emergency sections 46 and 47. The auxiliary reservoir 22b is connected by the pipe 52 and branch pipe 53 to the pipe bracket section 45 of the control valve and through a continuing passage 52a to various parts of the service section 46. The displacement volume 22c is connected by a pipe 54 to the pipe bracket section 45 of the control valve to which a passage 54a in the pipe bracket section is connected.

The straight-air pipe 16 and the supply reservoir pipe 17 are connected by branch pipes 16a and 17a respectively, to communicating passages in the pipe bracket section 45 of the control valve. An exhaust pipe 55 is also connected to a communicating passage in the pipe bracket section 45.

The supply reservoirs 23 are connected into the pipe 17a, thus giving the pipe 17 its name.

Attached to the pipe bracket section 45 of the D22 BR control valve below the emergency section 47 is a bracket containing a double check valve 56. The double check valve 56 is shiftable to either of two opposite positions in response to fluid pressures exerted on the opposite ends thereof. In one position, the double check valve 56 selectively connects the passage 16b, communicating with the branch pipe 16a of the straight-air pipe 16, to a passage 57 to which the so-called relay valve pipe 58 leading to the relay valve 21 is connected. In its opposite position, the double check valve 56 closes the communication just described and established a connection from the passage 54a to the passage 57.

When a service reduction of brake pipe pressure is effected, the service section 46 of the control valve responsively operates to cause fluid under pressure to be supplied from the auxiliary reservoir 22b to the passage 54a. The double check valve 56 is thus shifted to the position in which fluid under pressure is supplied from the passage 54a to the relay valve pipe 58.

When an emergency reduction of the pressure of the brake pipe 15 is effected the service section 46 and emergency section 47 of the D22 BR control valve function cooperatively to cause fluid under pressure to be supplied from both the auxiliary reservoir 22b and the emergency reservoir 22a to passage 54a thereby causing fluid at maximum pressure to be supplied to the relay pipe 58.

The straight-air pipe 16 is normally at atmospheric pressure while the brakes are released and is charged to a desired pressure under the control of the No. 21B magnet bracket, thereby effecting a straight-air application of the brakes as presently more fully explained. Fluid under pressure from the straight-air pipe 16 supplied to branch pipe 16a and passage 16b shifts the double check valve 56 to its opposite position, thereby establishing the connection through which fluid under pressure is supplied from the straight-air pipe 16 to the relay valve pipe 58.

The number 21B magnet bracket comprises a so-called application magnet valve 61, a release magnet valve 62, and a cut-off valve 63.

The magnet winding of the application magnet valve 61 is connected by wires 36a and 38a across the train wires 36 and 38, respectively. The magnet winding of the release magnet valve 62 is connected by wires 37a and 38a across the train wires 37 and 38, respectively.

The train wires 36 and 37 are connected to the so-called master controller (not shown) on the locomotive. This master controller is a pressure differential operated switch device subject in opposing relation to a control pressure supplied under the control of the self-lapping portion of the M-40-A automatic brake valve and to the pressure of the straight-air pipe 16. When the brake valve is operated to supply a given pressure to the master controller, suitable switch contacts connect the train wires 36 and 37 to the positive battery wire 39 thereby energizing the magnet winding of the application magnet valve 61 and the magnet winding of release magnet valve 62 in the number 21B magnet bracket. The release magnet valve is accordingly operated to cut-off the exhaust communication from the straight-air pipe 16 to atmosphere while the application magnet valve is operated to establish a communication from the pipe 52, connected to the auxiliary reservoir 22b, to a branch pipe 16c of the straight-air pipe 16. Fluid under pressure is thus supplied from the auxiliary reservoir 22b to the straight-air pipe 16 until such time as the pressure established in the straight-air pipe substantially balances the control pressure of the master controller on the locomotive. At such time, the switch contacts of the master controller are operated to deenergize the magnet winding of the application magnet valve 61 while causing the magnet winding of the release magnet valve 62 to remain energized. The application magnet valve 61 is thus operated to cut-off the supply of fluid under pressure to the straight-air pipe. The fluid pressure established in the straight-air pipe 16 thus corresponds substantially to the control pressure supplied to the master controller on the locomotive.

The cut-off valve 63 functions to prevent back flow of fluid under pressure from the straight-air pipe to atmosphere in the event of loss of pressure in the auxiliary reservoir 22b.

The relay valve 21 is of the supersensitive high-capacity type, described in detail in Patent No. 2,096,491 to Ellis E. Hewitt. Briefly it comprises a supply valve and a release valve operative through a floating lever by variations of fluid pressure in a control chamber 65 at one side of an operating piston 66 to which chamber fluid is supplied from the relay valve pipe 58. The opposite side of the piston 66 is subject to the fluid pressure in a so-called pressure chamber 67 to which a branch 18a of the decelostat valve pipe 18 is constantly connected. When fluid at a certain pressure is supplied to the control chamber 65 from the pipe 58, relay 21 is operated to cause fluid under pressure to be supplied from the supply reservoir pipe 17 by way of a branch pipe 17b to the pressure chamber 67 and thence through the pipe 18a to the decelostat valve pipe 18. The pressure established in the decelostat valve pipe 18 is automatically limited to a value corresponding substantially to the pressure established in the control chamber 65, by virtue of the self-lapping action of the valve mechanism of the relay valve 21.

The fluid under pressure supplied to the decelostat valve pipe 18 is supplied to both the decelostat valves 19 under the control of the corresponding reapplication control valves 25, in the manner hereinafter to be described.

Each decelostat valve 19 comprises a central pipe bracket section 19a, a relay valve section 19b secured to one face of the pipe bracket section, and a magnet valve section 19c secured to the opposite face of the pipe bracket section.

The pipe bracket section 19a has a chamber or volume reservoir 71, an air strainer 72, and various communicating passages presently to be identified.

The relay valve section 19b of the decelostat valves 19 is fundamentally the same in structure as the relay valve 21. Briefly, it comprises a supply valve 73, a release valve 74, and a floating lever 75 for operating the valves pivotally mounted on the stem of an operating piston 76. When fluid under pressure is supplied to the control chamber 77 at one side of the piston 76, the release valve 74 is seated and the supply valve 73 is unseated, thereby supplying fluid under pressure from the supply reservoir pipe 17 through a passage 17c to a pressure chamber 78 on the side of the piston 76 opposite the control chamber 77, and then through a passage 79 to a pipe 80 leading to the brake cylinders 11 and the corresponding K—3 switch which is connected to the pipe 80 through a branch pipe 81. When the pressure established in the brake cylinders 11 is substantially equal to the pressure established in the control chamber 77, the supply valve is seated to cut-off the further supply of fluid under pressure to the brake cylinders.

If the pressure in the control chamber 77 is reduced, the release valve 74 is unseated and fluid under pressure is exhausted to atmosphere from the brake cylinders and the pressure chamber 78 through an exhaust passage and port 83 until such time as the pressure in the pressure chamber 78 is reduced substantially to the pressure in the control chamber 77, when the release valve is reseated to cut-off further exhaust of fluid under pressure.

Fluid under pressure is supplied to the control chamber 77 from the decelostat valve pipe 18 under the control of the magnet valve section 19c.

The magnet valve section comprises a double beat valve 85 which is biased to an upper seated position by a coil spring 86 and operated to a lower seated position in response to energization of a magnet winding 88.

With the double beat valve 85 in its upper seated position communication is established from the decelostat valve pipe 18 and communicating passage 18b through the air strainer 72 to a passage 87, then past the double beat valve 85 in its upper seated position to a passage 89 having two branches, one of which leads to the volume reservoir 71 and the other of which leads to the control chamber 77 of the relay valve section 19b. The volume reservoir provides the necessary volume capacity for the control chamber 77.

It will thus be seen that as long as magnet 88 of the decelostat valve 19 is deenergized, the decelostat valve 19 permits the supply of fluid under pressure from the supply reservoir pipe 17 to the brake cylinders 11, in correspondence with the pressure of the fluid established in the decelostat valve pipe 18.

In its lower seated position, the double beat valve 85 closes the supply communication to the control chamber 77 just described and establishes an exhaust communication through which fluid under pressure is exhausted at a rapid rate from the control chamber 77. This communication is established from the passage 89 to an exhaust passage and port 91.

As long as the magnet winding 88 of the magnet valve section 19c is energized, fluid under pressure continues to be exhausted at a rapid rate from the control chamber 77, thereby causing the relay valve section 19b to operate correspondingly to effect the rapid reduction of fluid under pressure in the brake cylinders 11.

The pressure operated K—3 switches, as diagrammatically shown in Fig. 1 comprise a casing having a pressure chamber 95 formed at one side of a flexible diaphragm 96, the chamber 95 being connected by the branch pipe 81 to the brake cylinder pipe 80 with which the switch is associated. The pressure of the fluid supplied to the chamber 95 flexes the diaphragm 96 upwardly in opposition to a yielding coil spring 97 which acts on a slidable plunger 98 engaging the diaphragm 96. The plunger 95 is effective to operate a pivoted lever 99 that carries a contact bridging member 101 for connecting two stationary insulated contacts 102.

Spring 97 is so designed and adjusted that when the pressure in the chamber 95 is less than a certain pressure, such as fifteen pounds per square inch, the spring 97 shifts the plunger 98 so as to cause the contact bridging member 101 to separate from the contacts 102. When the pressure of the fluid in the chamber 95 rises above fifteen pounds per square inch, the spring 97 is yieldingly compressed and the contact bridging member 101 is shifted into bridging engagement with the contacts 102. In referring to the K—3 switches hereinafter, they will be referred to simply as closed or open without reference to the specific contacts.

The H—6 pressure operated switch differs in construction from the K—3 switch although the principle of operation is the same. The H—6 switch comprises a casing having a pressure cylinder 104 containing an operating piston 105, fluid under pressure being supplied to the cylinder 104 at one side of the piston 105 from the relay valve pipe 58. The piston 105 has a stem pivotally connected to one end of a pivoted switch operating lever 106, that is biased by a tensioned coil spring 107 in a clockwise direction to effect the disengagement of a contact bridging member 108 on the lever 106 from a pair of stationary insulated contacts 109, only one of which is visible in Fig. 1.

The strength of the spring 107 with respect to the area of piston 104 is such as to prevent the pivotal movement of the lever 106 in a counter-clockwise direction sufficient to cause engagement of contact member 108 with the stationary contacts 109 unless the pressure supplied to the cylinder 104 from the relay valve pipe 58 exceeds a certain low pressure, such as five pounds per square inch. In referring to the H—6 switch hereinafter, it will be spoken of as closed or open without reference to the specific contacts. Thus, the H—6 switch is closed when the pressure in the relay valve pipe 58 exceeds five pounds per square inch, and opened when the pressure in the relay valve pipe reduces below five pounds per square inch. The function of the H—6 switch will be made apparent hereinafter.

The reapplication control valve device 25 is a standard type self-lapping magnet valve device for controlling the pressure of fluid supplied thereby in proportion to the degree of energization of a magnet winding 111 thereof. Associated with the magnet winding 111 is a plunger 112 which is secured to a flexible diaphragm 113, the plunger being effective to exert a downward force on the diaphragm in accordance with the degree of energization of the magnet winding 111. The plunger 112 is secured to the diaphragm 113 in a manner to provide a port 114 connecting a chamber 115 on the lower side of the diaphragm to a chamber 116 on the upper side of the diaphragm which is constantly open to the atmosphere through an exhaust port 117.

A poppet valve 118, hereinafter called the supply valve, controls communication between a chamber 119 and the chamber 115, a spring 120 being effective to bias the supply valve 118 to a seated position. The supply valve 118 has a fluted stem 121, on the end of which is formed a pin valve, hereinafter referred to as the release valve.

When the magnet winding 111 is energized the diaphragm 113 is flexed downwardly to first effect seating of the release valve to close exhaust port 114 through which fluid under pressure is vented from the chamber 115. Thereafter, further downward movement of the diaphragm unseats the supply valve 118 to cause fluid under pressure to be supplied from the chamber 119 to the chamber 115. Fluid under pressure continues to be supplied to the chamber 115 until the force of the fluid under pressure in the chamber 115 acting upwardly in opposition to the downwardly applied force of the magnet winding substantially balances the force of the magnet winding at which time a coil spring 123 on the under side of the diaphragm is effective to shift the diaphragm 113 upwardly just sufficiently to permit the seating of the supply valve 118, and without unseating the release valve.

If the current energizing the magnet winding 111 is further increased, supply valve 118 is again unseated and fluid under pressure is again supplied to the chamber 115 until such time as the upwardly applied force of the fluid under pressure in the chamber 115 again balances the downwardly applied force of the magnet 111, when the valve 118 is again seated.

If the current energizing the magnet 111 is decreased, the force of the fluid under pressure in the chamber 115 shifts the diaphragm 113 upwardly thereby unseating the release valve and allowing fluid under pressure to escape to atmosphere from the chamber 115 through the exhaust port 117 until such time as the upwardly applied force of the fluid under pressure in the chamber 115 reduces to a substantially balanced relation with respect to the force of the magnet winding 111, at which time the release valve 123 is again seated to close off further exhaust of fluid under pressure from the chamber 115.

It will thus be seen that the self-lapping magnet valve device 25 controls the supply of fluid under pressure therefrom in accordance with the degree of energization of the magnet winding 111.

The self-lapping magnet valve device 25 is interposed in the decelostat valve pipe 18 in a manner to control the pressure of the fluid supplied to the corresponding decelostat valve 19, regardless of a possibly higher degree of pressure supplied to the decelostat valve pipe by the relay valve device 21. To this end, the supply side of the decelostat valve pipe is connected to the chamber 119 and the delivery side of the decelostat valve pipe is connected to the chamber 115 of the self-lapping magnet valve device 25.

In order to insure the rapid reduction of the pressure in the control chamber 77 of the corresponding decelostat valve 19 past the self-lapping magnet valve device 25, a one-way or check valve device 124 is provided in parallel relation to the self-lapping magnet valve device. The check valve 124 prevents the supply of fluid under pressure therepast to the corresponding decelostat valve 19, but permits the reverse flow of the fluid under pressure therepast at a rapid rate when the pressure in the decelostat valve pipe is reduced by operation of the relay valve device 21.

The rheostats 26, shown on Fig. 2 of the drawings, are provided for controlling the degree of energization of the magnet winding 111 of the corresponding reapplication control valve device 25. As diagrammatically shown in the drawings, each of the rheostats 26 comprises a suitable resistor 26a connected at uniformally spaced intervals to successive arcuately arranged contact segments 26b with which a rotating contact arm 26c cooperates.

The contact arm 26c is fixed on the rotary shaft 27a, represented by the broken line, of the stepping relay 27, a contact member being provided at each end of the arm 26b at the same radial distance from the shaft 27a. The arrangement of the contact arm 26c with respect to the contact segments 26b is such that as the arm rotates in the direction of the arrow, successively increasing portions of the resistor 26a are cut into the circuit of the magnet winding 111 of the corresponding reapplication control valve device 25 which circuit will be traced hereinafter in detail.

The contact arm 26c of the rheostat 26 always rotates in one direction indicated by the arrows as in the counterclockwise direction for the left-hand rheostat 26 and the clockwise direction for the right-hand rheostat 26. In order to provide an electrical connection to the contacts on the rotary arm 26c, a suitable collector ring 132 electrically connected to the contacts at the ends of the contact arm 26c and fixed in insulated relation on the arm or on the shaft 27a and having a stationary brush or contact 133 in engagement therewith is provided. As will be explained more fully hereinafter, the contact on one end of the contact arm 26c is effective for one 180° of rotation of the contact arm while the contact at the opposite end of the arm is effective for the succeeding 180° rotative movement of the contact arm, thereby enabling the contact arm to be rotatively shifted always in one direction without reversal.

The stepping relays 27 are of the rotary type similar to that employed in automatic dial telephone exchange equipment. As diagrammatically shown, each stepping relay 27 comprises a plurality of contacts 27b arranged in a semicircle and connected together by a common bus wire 134, a rotary contact arm 27c fixed on the rotary shaft 27a of the relay 27 being effective to successively engage the contacts 27b as the shaft rotates.

The contact arm 27c of the stepping relay 27 has contacts at the opposite ends thereof both of which are disengaged from the series of connected contacts 27b in the normal position of the contact arm, shown as the horizontal position in Fig. 2. The contacts on the ends of the contact arm 27c of each relay 27 are operatively effective respectively for succeeding 180° of rotation of the shaft 27a, thereby enabling the shaft to rotate always in one direction.

Since the contact arm 27c rotates continuously in one direction corresponding to the direction of rotation of the contact arm 26c of the associated rheostat 26, a suitable collector ring 135 and stationary brush 136 is provided for establishing an electrical connection to the contacts on the contact arm 27c.

Step-by-step rotative movement of the shaft 27a of the relay 27 is effected by alternate energization and deenergization of a magnet winding 27d through the medium of conventional pawl 27p and ratchet wheel 27r, diagrammatically shown in the drawings.

A back contact 27e is provided for each relay 27 which is operated, whenever the winding 27d is energized, from a normal dropped-out or closed position to a picked-up or open position. As diagrammatically shown, contact 27e is carried in insulated relation on an armature that is movably responsive to energization of the winding 27d, the armature being hinged to the pawl 27p for actuating the pawl.

Whenever the winding 27d of each relay 27 is energized, the pawl of the relay is actuated to advance the ratchet wheel, fixed on the rotary shaft 27a, a distance corresponding to the angular distance between the contacts 27b of the relay and also to the angular distance between the contacts 26b of the associated rheostat 26. When the magnet winding 27d is deenergized, the pawl is restored, by biasing means not shown, to a position so as to again advance the ratchet wheel and shaft 27a upon subsequent energization of the magnet winding.

Continued energization or deenergization of the magnet winding 27d is ineffective to produce rotative movement of the rotary shaft 27a, it being essential that magnet winding 27d be alternately energized and deenergized successively and repeatedly in order to advance the shaft 27a.

The principle of operation of the electrical wheel slip detecting apparatus including the axle-driven generators 28 and the corresponding decelostat relays 29 and condensers 30 is well understood and well known. Briefly, when the voltage of a generator 28 increases with increasing speed of rotation of the corresponding wheel-and-axle assembly, a current is supplied to charge the condenser 30, which current energizes the pick-up winding a of the corresponding decelostat relay 29. Relays 29 are of the unidirectional type and are so connected that the contacts of the relays are not picked-up in response to condenser charging current. When the voltage supplied by a generator 28 decreases, the condenser 30 associated therewith discharges a current reversely in the circuit through the pick-up winding a of the corresponding relay 29 in the proper direction to cause pick-up of the contacts of the relay.

The degree of the current energizing the pick-up winding a of each relay 29 is substantially proportional to the rate of change of voltage delivered by the corresponding generator. Because the rate of change of voltage of the generators 28 is proportional to the rate of change of rotational speed of the corresponding wheel-and-axle unit the degree of current energizing the pick-up windings a of the decelostat relay 29 is likewise proportional to the rate of acceleration or the rate of deceleration of the wheel-and-axle unit.

Each decelostat relay 29 is so designed that the contacts thereof are not actuated to the picked-up position unless the current energizing the pick-up winding a of the relay exceeds a certain value corresponding to a certain rate of rotative deceleration of the corresponding wheel-and-axle unit, such as ten miles per hour per second, which occurs only when the wheel-and-axle unit slips.

All of the decelostat relays 29 are identical although certain of the relays are indicated as provided with two front contacts c and d whereas certain others are indicated as having only one front contact c. The front contact d of certain of the relays 29 is omitted from the drawings for simplicity since it is not employed in the control equipment shown. Moreover, the one relay 29 for each wheel truck having the single front contact c has a so-called holding winding b shown in the drawings but not employed in the particular control equipment.

The relays 29 for each wheel truck are provided for controlling energization and deenergization of the magnet winding 88 of the decelostat valve 19 and the magnet windings 27d of the stepping relays 27 for the corresponding wheel truck, in the manner hereinafter to be more fully described.

The generators 28 may be of any suitable type, preferably of the permanent magnet field or magneto type in which the polarity of the voltage at the terminals reverses upon a reversal in the direction of rotation of the rotary armature. In order, therefore, to cause the relays 29 to function properly regardless of the reversal of direction of rotation of the car wheels, it is necessary to reverse the connections of the circuit including the pick-up winding a of each decelostat relay 29 and its corresponding condenser 30 to the terminals of the corresponding generator 28 upon a reversal in the direction of the rotation of the car wheels. This function is performed automatically in the equipment shown, by means of the repeater relays 32 and 33.

Relays 32 and 33 are standard type neutral relays each having a magnet winding w and a plurality of contacts, operated to respective picked-up positions in response to energization of the winding and restored to dropped-out positions in response to the deenergization of the winding. Each of the relays 32 and 33 has four transfer contacts a, b, c, and d, a front contact e, and a back contact f.

Each of the transfer contacts of the repeater relay 32 is associatively connected with the correspondingly designated transfer contact of repeater relay 33 in familiar manner to control the connections to the corresponding generator 28 so as to provide a constant polarity of voltage impressed on the series-connected pick-up winding a of each decelostat relay 29 and the associated condenser 30, regardless of the polarity of the generator voltage and thus of the direction of rotation of the car wheels.

The repeater relays 32 and 33 are selectively picked-up in accordance with the direction of rotation of the car wheels by means of the directional relays 34 and 35 respectively controlling the relays 32 and 33 in the manner presently to be described.

Relays 34 and 35 are of the unidirectional type, each relay having two separate pick-up windings a and b, and a single front contact c.

The pick-up windings a of the two relays 34 and 35 are connected in series relation across the terminals of one of the generators 28 of one of the wheel trucks, illustrated as the wheel truck 13. In a similar manner, the pick-up windings b of the two relays 34 and 35 are connected in series relation across the terminals of the other generator 28 of the wheel truck 13. The connections to the windings a and b of the relay 34 are reversed compared to the connections to the corresponding windings a and b of the relay 35, so that when the current flows through the windings in one direction, only one of the relays will be picked-up while the other remains dropped-out. As shown, it will be assumed that the polarity at the terminals of the generators 28 for the forward direction of travel of the car is such that only the relay 34 is picked-up. Conversely, it will be assumed that when the car travels in a reverse direction, only the relay 35 is picked-up, the relay 34 simultaneously remaining in its dropped-out position.

The two windings of each of the directional relays 34 and 35 are so designed as to assist each other, and each of the windings is effective of itself to cause pick-up of the relay although a somewhat higher voltage is required for a single winding than when both windings are effective. Thus the windings a and b of relays 34 and 35 are so designed that with both windings effective, the voltage of the generators 28 causes sufficient energization of the windings to cause pick-up of either one or the other of the relays when the speed of the car exceeds a certain low speed, such as eight miles per hour.

The reason for providing two windings on each of the directional relays each operative to cause pick-up of the relay in response to voltage supplied from a different generator is to insure against failure of the directional relays to operate due to failure of one of the axle-driven generators 28. Heretofore, the directional relays 34 have been provided with but one operating winding energized from one axle-driven generator and the failure of this one generator, due to an open circuit, a loose connection, or burned-out armature winding, resulted in failure to pick-up the corresponding repeater relay 32 and 33 and the consequent failure to render the decelostat relays 29 potentially effective.

It is accordingly a novel feature of my present invention to provide directional relays 34 and 35 having a plurality of pick-up windings, each of which is energized by a different axle-driven generator, so that if one generator fails the other generator still remains effective to cause the proper operation of the directional relays.

It is a relatively remote possibility that both of the axle-driven generators 28 energizing the windings of the directional relays 34 and 35 will fail at the same time. This arrangement for operating the directional relays accordingly greatly reduces the possibility of failure of the electric wheel slip detecting apparatus to operate and is, therefore, highly important since it ultimately affects the safety of operation of the railway cars and trains.

OPERATION OF EMBODIMENT SHOWN IN FIGS. 1 AND 2

(a) *Emergency application of brakes*

Let it be assumed that a train having the car equipped in the manner disclosed in Figs. 1 and 2 is traveling under power with the brakes released, it being understood that the brake pipe 15 is correspondingly charged with fluid under pressure in the usual manner and that the supply reservoirs 23, auxiliary reservoir 22b and emergency reservoir 22a are likewise charged to the normal pressure carried therein.

Let it now be further assumed that the operator desires to bring the train to a stop and operates the M-40-A automatic brake valve on the locomotive in usual manner so as the produce an automatic emergency application of the brakes by reduction of the pressure in the brake pipe 15 at an emergency rate. The service and emergency sections 46 and 47 of the D22 BR control valve accordingly operate in the usual manner to supply fluid under pressure from the auxiliary reservoir 22a and from the emergency reservoir 22b past double check valve 56 to establish a maximum pressure in the relay valve pipe 58 of the order of one hundred pounds per square inch.

When the pressure in the relay valve pipe 58 exceeds five pounds per square inch, the H—6 switch is closed, thereby establishing a connection from the positive battery wire 39 to a positive bus wire 139.

Upon such energization of the positive bus wire 139, a circuit is established for energizing the winding w of one or the other of repeater relays 32 or 33, depending upon the direction of travel of the car. Assuming that the car is traveling in a forward direction and that the front contact c of the relay 34 has thus previously been actuated to its picked-up or closed position, the energization of the positive bus wire 139 completes the circuit for energizing the winding w of the repeater relay 32. This circuit extends from the positive bus wire 139 by way of a branch wire 141, a second branch wire 142 including the contact c of the directional relay 34 and the winding w of repeater relay 32 in series relation therein, and a wire 143 to the negative battery wire 38.

The contacts of the repeater relay 32 are accordingly actuated to their respective picked-up positions, to establish the connection from each generator 28 to the corresponding associated decelostat relay 29 and condenser 30. At the same time, the actuation of the front contact e of the repeater relay 32 to its picked-up or closed position establishes a self-holding circuit for maintaining the winding of the relay 32 energized independently of the contact of the directional relay 34. This self-holding circuit extends from the positive bus wire 139 by way of the branch wire 141, contact e of the repeater relay 32 and the wire 144, wire 142, winding w of relay 32 to the wire 143, and thence to the negative battery wire 38.

Due to the self-holding circuit established therefor, the repeater relay 32 is accordingly maintained picked-up thereafter as long as the H—6 switch remains closed. If for some reason, therefore, such as failure of the generators 28 for wheel truck 13, either of the directional relays should be restored to its dropped-out position during a brake application, drop-out of the corresponding repeater relay 32 or 33 does not occur until the brakes are released. Moreover, since the directional relays 34 are picked-up only when vehicle speed exceeds eight miles per hour, it will be seen that the diminution of the speed of the vehicle or train below eight miles per hour after a brake application is initiated does not cause drop-out of the repeater relays.

Energization of the bus wire 139 also effects energization of the magnet winding 111 of each of the reapplication control valve devices 25. The circuit for the magnet winding 111 of each reapplication control valve device 25 extends from the bus wire 139 by way of the resistor 26a of the corresponding rheostat 26, one end of which is connected to the bus wire, contact arm 26c in its initial position shown in which the major portion of the resistor 26a is cut out of the circuit, collector ring 132 and brush 133, a wire 145, the magnet winding 111 of the reapplication control valve device 25, and a wire 146 to the negative battery wire 38.

In view of the fact that the major portion of the resistor 26a of rheostat 26 is cut out at this time, the magnet winding 111 of the reapplication control valve device 25 is energized by a maximum current determined according to the voltage of the battery 41 and the resistance of the portion of resistor 26a in the circuit. The maximum current is selected so as to limit the pressure of fluid supplied by the reapplication control valve device 25 to the corresponding decelostat valve 19 to a corresponding value, such as one hundred pounds per square inch, and corresponding substantially to the maximum pressure suppliable to the decelostat valves 19 during an emergency application of the brakes.

With fluid at approximately one hundred pounds per square inch pressure supplied during an emergency application to the relay valve pipe 58 and the control chamber 65 of the relay valve device 21, the relay valve device 21 operates to supply a corresponding pressure of approximately one hundred pounds per square inch to the decelostat valve pipe 18. Consequently, with the reapplication control valve devices 25 conditioned to cause the supply of fluid under pressure up to a maximum of one hundred pounds per square inch, the full pressure of the fluid delivered by the relay valve device 21 is supplied to the control chamber 77 of the relay valve section 19b of the decelostat valves 19.

The relay valve section 19b of each decelostat valve 19 is accordingly operated to supply fluid under pressure from the supply reservoirs 23 and pipe 17 to the pipe 80 and the connected brake cylinders 11 and K—3 switch, the pressure established in the brake cylinders corresponding substantially to that in the control chamber 77, namely one hundred pounds per square inch.

The brakes are accordingly applied on the car wheels to a maximum degree corresponding to an emergency application of the brakes, and the K—3 switches are operated to their respective closed positions. Such operation of the K—3 switches to closed position is without immediate effect except to condition the circuit of the magnet winding 88 of the magnet valve section 19c of the corresponding decelostat valve 19.

Let it now be assumed that the wheels of one of the wheel trucks, such as the wheels of the right-hand wheel-and-axle unit of the truck 13, begin to slip in response to the emergency brake application. The pick-up winding a of the upper decelostat relay 29 corresponding to this set of wheels is thus energized by current discharged from the corresponding condenser 30 to a degree sufficient to cause pick-up of the contacts of the relay, which is thus effected.

Actuation of the contact b of the decelostat relay 29 for the slipping wheels of truck 13 to its picked-up or closed position establishes a circuit for energizing the magnet winding 88 of the magnet valve section 19c of the decelostat valve 19 for truck 13, and also establishes a self-holding circuit including the holding winding b of the relay. This circuit extends from the bus wire 139, which is connected by the H—6 switch to the positive battery wire 39 in the manner previously indicated by way of a branch wire 151, holding winding b of the decelostat relay 29 for the slipping set of wheels, contact c of the same relay 29, wire 152, the K—3 switch associated with the decelostat valve 19 for wheel truck 13, a wire 153 to one terminal of the magnet winding 88 of the decelostat valve 19 for the wheel truck 13, and a wire 154 to the negative train wire 38.

The magnet valve section 19c of the decelostat valve 19 is accordingly operated to cause fluid under pressure to be rapidly vented from the control chamber 77 of the relay valve section 19b of the decelostat valve through exhaust passage and port 91. The relay valve section 19b operates correspondingly to cause fluid under pressure to be rapidly vented to atmosphere from brake cylinders 11 for the wheel truck 13 through the exhaust passage and port 83.

The reduction of pressure in the brake cylinders 11 for wheel truck 13 continues at a rapid rate until such time as the pressure in the brake cylinders is reduced below fifteen pounds per square inch, at which time the corresponding K—3 switch is restored to its open position. The restoration of the K—3 switch to its open position interrupts the circuit for energizing the magnet winding 88 of the magnet valve section 19c of the decelostat control valve 19 and the holding winding b of the operated decelostat relay 29.

Due to the rapid reduction in the degree of application of the brakes associated with the slipping wheels of wheel truck 13 effected in the manner just described, the slipping wheels promptly cease to decelerate and begin to accelerate back toward a speed corresponding to car speed. The interval of time elapsing from the time the wheels began to slip until they are restored substantially to car speed is of the order of several seconds, and this length of time is ordinarily less than that required to reduce the pressure in the brake cylinders to below fifteen pounds per square inch from the high pressure established during an emergency application of the brakes. Consequently, the slipping wheels are restored to car speed and decelerate again correspondingly to the rate of retardation of the car or train before the K—3 switch opens in response to the reducing brake cylinder pressure.

It follows, therefore, that when the self-holding circuit including the holding winding of the decelostat relay 29 associated with the wheels which slipped is interrupted by opening of the K—3 switch, the contacts of the relay are restored to their dropped-out position and remain therein until such time as slipping of the wheels again occurs.

Upon deenergization of the magnet winding 88 of the magnet valve section 19c of the decelostat control valve 19 in response to the opening of the K—3 switch, the exhaust communication for the control chamber 77 of the relay valve section 19b is closed and the supply communication thereto from the decelostat valve pipe 18 is again established. The relay valve section 19b accordingly operates promptly to cause fluid under pressure to be resupplied from the supply reservoir pipe 17 to the pipe 80 and the connected K—3 switch and brake cylinders 11.

The K—3 switch is thus almost instantly reclosed, but due to the fact that the self-holding contact b of the decelostat relay 29 has been restored to its dropped-out position, reclosure of the K—3 switch does not cause the relay 29 to be picked-up.

The pressure of the fluid supplied from the decelostat valve pipe 18 to the control chamber 77 of the relay valve section 19b is limited to a lower value than that in effect when the brakes were initially applied, by reason of the fact that the reapplication control valve device 25 has in the meantime been conditioned to limit the pressure of fluid supplied through the decelostat valve pipe 18 to the control chamber 77 of the relay valve section 19b to such lower value.

The conditioning of the reapplication control valve device 25 to limit the pressure of the fluid resupplied to the decelostat valve 19 to a lower value following the restoration of the slipping wheels to car speed is effected in response to the operation of the contact d of the decelostat relay 29 to its picked-up position. With the contact d of the operated decelostat relay 29 for wheel truck 13 in its picked-up position, a circuit is established for energizing the magnet winding 27d of the stepping relay 27 for wheel truck 13. This circuit extends from the bus wire 139 by way of the branch wire 151, contact d of the operated decelostat relay 29, and the wire 158 including the magnet winding 27d of the stepping relay 27 to the negative train wire 38.

The contact arm 26c of the corresponding rheostat 26 is thus advanced in a counter-clockwise direction to the next succeeding contact segment 26b and the contact arm 27c of the stepping relay is advanced to the first of the series of contact segments 27b.

The advance of the contact arm 26c of the rheostat 26, in the manner just described introduces into the circuit of the magnet winding 111 of the reapplication control valve device 25 an additional increment of resistance which is effective to correspondingly reduce the current energizing the magnet winding 111. This increment of resistance inserted by advancing the contact arm 26c of the rheostat 26 one step, may be any selected value so as to cause a certain percentage of reduction of the maximum pressure of the fluid supplied through the reapplication control valve device 25 to the decelostat valve 19. By way of illustration, it will be assumed that the increment of resistance inserted by advancing the contact arm 26c one step will effect a reduction of ten per cent in the maximum pressure delivered through the reapplication control valve device 25. Thus, if as previously assumed, the maximum pressure delivered through the reapplication control valve device 25 is one hundred pounds per square inch, the advance of the contact arm 26c of rheostat 26 one step in the manner just described will cause the reapplication control valve device 25 to be conditioned automatically to limit the pressure supplied therethrough to ninety pounds per square inch.

It will thus be apparent that the pressure of the fluid resupplied from the decelostat valve pipe 18 to the control chamber 77 following the interruption of the energizing circuit of the magnet winding 88 of the decelostat valve 19 by opening of the corresponding K—3 switch is limited to a certain percentage lower than that initially established, for example, ninety pounds instead of one hundred pounds as originally.

When the operated decelostat relay 29 is restored to its dropped-out position, the contact d thereof is likewise restored to its dropped-out or open position, thereby deenergizing the magnet winding 27d of the stepping relay 27. As previously indicated, the deenergization of the magnet winding 27d causes the pawl associated with the operating ratchet wheel on the rotary shaft 27a of the stepping relay to be restored to a position preparatory to again advancing the rotary shaft another step upon subsequent reenergization of the magnet winding.

If the adhesion between the wheels and the track rails is such that reapplication of the brakes associated with the wheels which slipped is still sufficient in degree to cause the wheels to again begin to slip, the above operation is repeated in response to the pick-up of the decelostat relay 29. In this instance, the contact arm 26c of the rheostat 26 is again advanced another step in a counterclockwise direction in response to the operation of the stepping relay 27. A second increment of resistor 26a of rheostat 26 is thus introduced into the circuit of the magnet winding 111 of the reapplication control valve device 25, thereby further reducing the current energizing the magnet winding.

Assuming that the current energizing the magnet winding 111 is reduced substantially the same percentage of the maximum current each time an increment of resistor 26a is introduced into the circuit, it will be seen that the maximum pressure of fluid deliverable to the decelostat valve 19 when the K—3 switch is opened in response to the reduction of the pressure in the brake cylinders, is limited to a value that is a certain uniform amount lower than the previous limited value. In this instance, the maximum pressure delivered through the reapplication control valve device 25 to the decelostat valve 19 will be eighty pounds per square inch instead of the previous ninety pounds per square inch pressure.

Each time a wheel slip occurs, therefore, the reapplication control valve device 25 is conditioned automatically to limit the pressure of the fluid resupplied from decelostat valve pipe 18 to the decelostat valve 19 to a value which is a certain uniform amount lower than the previous limited value. The automatic reconditioning of the reapplication control valve device 25 is repeated as many times as is necessary to prevent slippage of the wheels from occurring in response to the reapplication of the brakes following slipping. Obviously, depending upon the adhesion between the car wheels and rails, the number of slipping cycles will vary. Thus, in some instances only one slipping cycle will occur, whereas in other instances two and even three or more slipping cycles may occur. In every instance, however, the number of cycles will be low because the pressure of the fluid resupplied to the brake cylinders after each cycle will be automatically limited to a lower value, until the reduction is sufficient to preclude the possibility of slipping of the wheels.

While, ordinarily, the rear wheels of the car truck will slip before the forward wheels because of the well known shifting of the theoretical point of load application on the truck when a brake application is effected, it is possible that the forward wheels of a car truck may begin to slip without slipping of the rear wheels. In such case, assuming that the forward wheels only of the truck 13 begin to slip, that is the left-hand wheels, the corresponding lower decelostat relay 29 is picked-up. Pick-up of the contact c of this decelostat relay is effective to establish a circuit for energizing the magnet winding 88 of the magnet valve section 19c of the decelostat control valve 19 and a circuit for energizing the holding winding b of decelostat relay 29 for the rear wheels of the truck. This circuit will be apparent from previous description of the circuit for energizing the holding winding b of the upper decelostat relay 29 because the contact c of the decelostat relay 29 for the forward set of wheels is connected in parallel with the contact c of the decelostat relay 29 for the rear set of wheels.

The holding winding b of decelostat relay 29 for the rear set of wheels is designed to act as a pick-up winding in this instance and consequently the contacts of the decelostat relay 29 for the rear set of wheels is picked-up just as if the rear set of wheels actually slipped. Once the contacts of the decelostat relay 29 for the rear set of wheels is picked-up, the operation is exactly the same as previously described for a slipping condition of the rear set of wheels and a description of such operation is accordingly not repeated.

The control of the decelostat valve 19 and reapplication control valve 25 for the rear wheel truck 14 by means of the corresponding decelostat relays 29 is identical to that previously described for wheel truck 13 and accordingly a description thereof is deemed unnecessary. It is sufficient to point out in this connection, that the brakes associated with each wheel truck 13 and 14 are controlled separately and individually in response to the slipping condition of the wheels of that truck. In other words, slipping of the wheels of a particular wheel truck effects only the brakes of that particular truck and no other truck.

When the train comes to a stop in response to the emergency application of the brakes effected in the manner previously described, the magnet windings 88 of the decelostat control valves 19 are ultimately deenergized due to the drop-out of the decelostat relays 29 resulting from a cessation of change in the rotational speed of the car wheels, or due to the operation of the K—3 switch whichever occurs first. In any case, fluid under pressure is always resupplied by the decelostat valves 19 to the brake cylinders 11 to maintain a brake application while the train is stopped.

(b) *Release of brakes following emergency application of brakes*

When the operator again desires to start the train, he first releases the brakes in the usual manner by suitably operating the M—40—A brake valve on the locomotive to its brake release position. Upon the consequent restoration of pressure in the brake pipe 15 to its normal value, the service and emergency sections 46 and 47 of the D22 BR control valve operate in well known manner to cause fluid under pressure to be released from the relay valve pipe 58 to atmosphere through the exhaust pipe 55 and at the same time effect recharging of the auxiliary reservoir 22b and emergency reservoir 22a as well as of the supply reservoir 23.

The reduction of the pressure in the relay valve pipe 58 causes operation of the relay valve 21 to effect the corresponding reduction of the pressure in the decelostat valve pipe 18 leading to the decelostat control valves 19. In this instance, the fluid under pressure is released directly from the decelostat valves in by-passing relation to the reapplication control valve devices 25 through the check valves 124 to enable reduction of the brake cylinder pressure by the decelostat valves as rapidly as effected by the relay valve device 21.

Obviously, the magnet winding 111 of the reapplication control valve 25 remains energized as long as the H—6 switch remains closed. In the absence of the check valves 124 by-passing the reapplication control valves 25, however, it would be necessary to reduce the pressure in the relay valve pipe 58 below five pounds per square inch in order to effect opening of the H—6 switch to thereby effect deenergization of the magnet winding of the reapplication control valve devices 111, before reduction of the pressure in the control chamber 77 of the relay valve section 19b of the decelostat valves 19 could be effected. Moreover, the exhaust capacity of the self-lapping type of magnet valve device, such as the reapplication control valves 25 are, is much less than that of the relay valve 21. It will thus be seen that without the check valves 124 by-passing the reapplication control valve devices 25, the release of the brakes would be undesirably delayed.

As previously indicated, the reduction of the pressure in the decelostat valve pipe 58 to below five pounds per square inch causes the H—6 switch to be restored to its open position, thereby deenergizing the magnet windings 111 of the reapplication control valve devices 25. It will thus be seen that the control apparatus which I have provided is such as to necessitate the energization of the magnet windings 111 of the reapplication control valves 25 only while the brakes are applied, thereby, avoiding consumption of current from the source of supply, that is the battery 41, at other times.

The restoration of the H—6 switch to its open position effects deenergization of the self-holding circuit for the repeater relay 32, and the contacts of this relay are accordingly restored to their dropped-out positions. The back contacts *f* of the two repeater relays 32 and 33 are jointly effective when both relays are in their dropped-out position, to establish a circuit for energizing the magnet winding 27*d* of the stepping relays 27 if they are operated during a brake application out of the normal position thereof. Thus, when the repeater relay 32 is restored to its dropped-out position, a circuit is established for energizing the magnet winding 27*d* of the stepping relay 27 for wheel truck 13. This circuit extends from the positive battery wire 39 by way of a branch wire 39*a* including, in series relation, the two back contacts *f* of the repeater relays 32 and 33, to a wire 161 which is connected to the common connector wire 134 for the contact segments 27*b* of the stepping relays 27 on the car, then by way of the contact arm 27*c* of the stepping relay 27 in its displaced position, collector ring 135 and brush 136, the wire 162 including the back contact 27*e* of the stepping relay 27 to the wire 153, and thence through the magnet winding 27*d* of the stepping relay to the negative battery wire 38.

The contact arm 27*c* of the stepping relay and the contact arm 26*c* of the rheostat 26 are thus advanced one step in the operating direction and, at the same time, the pick-up of the back contact 27*e* interrupts the circuit for energizing the magnet winding 27*d*. The back contact 27*e* is thus restored to its dropped-out position and the actuating pawl is also restored to a position preparatory to subsequent advance of the rachet wheel and rotary shaft 27*a* upon subsequent deenergization of the magnet winding 27*d*. Upon the restoration of the back contact 27*e* to its dropped-out or closed position, the magnet winding 27*d* is again energized over the previously described circuit including back contacts *f* of repeater relays 32 and 33 to advance the contact arms 26*c* and 27*c* another step in the operating direction. This operation is repeated automatically until such time as the contact arms are restored to their normal positions. As previously indicated, the rotary movement of the shaft 27*a* necessary to restore the rheostat 26 and stepping relay 27 to their normal positions will be thus limited to an angle corresponding to the difference between 180° and the angle of displacement from normal position.

With the contact arm 27*c* of the stepping relay restored to its normal position, neither of the contacts on the contact arm engage any of the contact segments 27*b*. Thus the circuit, including the back contact 27*e* of the stepping relay, for energizing the magnet winding 27*d* is not established. Consequently, the magnet winding 27*d* remains deenergized with the contact arm 27*c* in its normal position.

The stepping relays 27 and rheostats 26 are thus automatically restored to the normal condition thereof in response to the release in the brakes.

*(c) Service application of brakes*

In the above description of the operation of the equipment it was assumed that an emergency application of the brakes was effected because of the fact that the highest degree of brake application is effected with the consequent likelihood of slipping or sliding of the wheels. However, it is possible that slipping of the wheels may occur during a service application of the brakes. As previously explained a service application of the brakes may be effected by operation of the M—40—A brake valve on the locomotive. The M—40—A brake valve on the locomotive may effect a service application, for example a full service application of the brakes, either by so-called automatic operation involving a reduction of pressure in the brake pipe 15, or by so-called electro-pneumatic or straight-air operation wherein the No. 21—B magnet bracket on the cars are controlled by the master controller on the locomotive to cause charging of the straight-air pipe 16 to a degree corresponding to the desired degree of service application.

In either case, fluid at a pressure corresponding to the desired degree of service application, here assumed to be a full service application, is supplied to the relay valve pipe 58 from the auxiliary reservoir 22*b* the maximum pressure established in pipe 58 for a full service application of the brakes being of the order of seventy-five pounds per square inch, which is considerably less than the maximum one hundred pounds per square inch established during an emergency application of the brakes.

As in the case of an emergency application of the brakes, the relay valve device 21 functions during a service application of the brakes in response to the pressure of fluid supplied thereto through the relay valve pipe 58 to cause fluid under pressure to be supplied from the supply reservoirs 23 to the decelostat valve pipe 18 and thence to the decelostat valves 19, which in turn operate to supply fluid at a corresponding pressure from the supply reservoirs 23 to the brake cylinders 11.

Due to the fact that the reapplication control valves 25 are initially conditioned to permit the supply of fluid at a maximum pressure of one hundred pounds per square inch to the decelostat valves 19, in response to the closure of the H—6 switch as the result of the supply of fluid under pressure to the relay valve pipe 58, it will be seen that no limitation is effected initially by the reapplication control valves on the pressure of fluid supplied from the relay valve 21 to the decelostat valves 19.

In the event that any of the wheel-and-axle units on the car begin to slip during the service application of the brakes, the corresponding decelostat valve 19 is operated, in exactly the same manner as previously described for an emergency application of the brakes, to cause a rapid reduction of the pressure in the brake cylinders 11, and the stepping relay 27 corresponding to the slipping wheel-and-axle units is operated, in the manner previously described, to effect a reduction in the degree of energization of the magnet winding 111 of the corresponding reapplication control valve 25. The limit of the pressure of fluid supplied to the decelostat valves 19 upon reapplication of the brakes following restoration of the slipping wheels to car speed is thus reduced by approximately ten per cent to ninety pounds per square inch. This pressure is, however, still higher than the maximum pressure of seventy-five pounds per square inch supplied by the relay valve 21 to the decelostat valves 19 during a full service application of the brakes. Thus, in the case of wheel slippage during application of the brakes, no reduction of the ultimate pressure resupplied to the brake cylinders 11 occurs following the first wheel slip cycle.

If the same wheel-and-axle unit again begins to slip upon reapplication of the brakes, the same operation is repeated and the degree energization of the magnet winding 111 of the reapplication control valve 25 is again further reduced another ten per cent to thereby limit the pressure of fluid resupplied by the relay valve 21 to the decelostat control valve 19 to a pressure of eighty pounds per square inch. This pressure is still higher than the maximum pressure supplied by the relay valve 21 to the decelostat valves 19 during the full service application of the brakes, and consequently no reduction in the maximum degree of application of the brakes is effected following the second slipping cycle.

If the wheels of the same wheel-and-axle unit again begin to slip a third time upon reapplication of the brakes, the same operation is repeated and the energization of the magnet winding 111 of the reapplication control valve 25 is further reduced another ten per cent, thereby causing the control valve 25 to limit the pressure of the fluid resupplied from the relay valve 21 to the corresponding decelostat valve 19 to a pressure of seventy pounds per square inch, which is less than the maximum of seventy-five pounds per square inch supplied by the relay valve 21 during a full service application.

The operation of the decelostat valve 19 and the continued incremental or step-by-step reduction in the degree of energization of the magnet winding 111 of the reapplication control valve 25 is repeated as many times as the wheels slip upon reapplication of the brakes until such time as the wheels do not slip in response to the reduced degree of application of the brakes.

The only difference, therefore, in the operation of the equipment in response to wheel slipping, as between an emergency application and a service application, is that during a service application the degree to which the brakes are reapplied on a slipping wheel is not reduced below that initially effected until a plurality of slipping cycles have occurred, whereas in the case of wheel slipping during an emergency application of the brakes the degree to which the brakes are reapplied following wheel slipping is reduced, in response to the first slipping cycle, below that initially effected.

When the train comes to a stop in response to a service application of the brakes, the brakes remain applied until subsequently released by the operator prior to again starting the train. The release of the brakes is effected in response to the exhaust of fluid under pressure from the control chamber 65 of the relay valve 21 in the same manner as previously described in connection with an emergency application of the brakes. At the same time, the restoration of the H—6 switch to its open position in response to the release of the brakes causes automatic restoration of the stepping relays 27 and rheostats 26 to their normal positions if they have been displaced out of their normal positions during the brake application.

Figure 3:
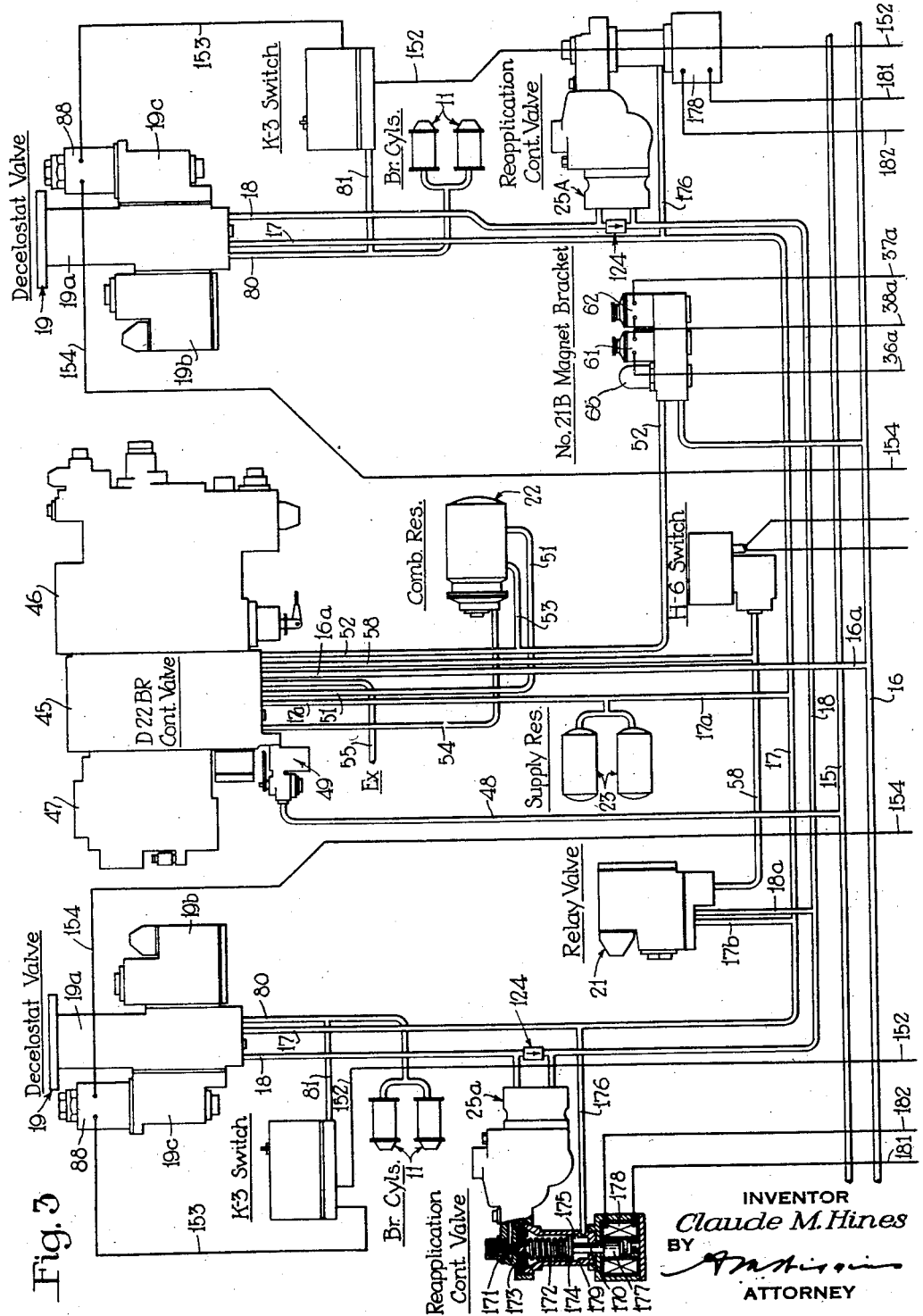
Figure 4:
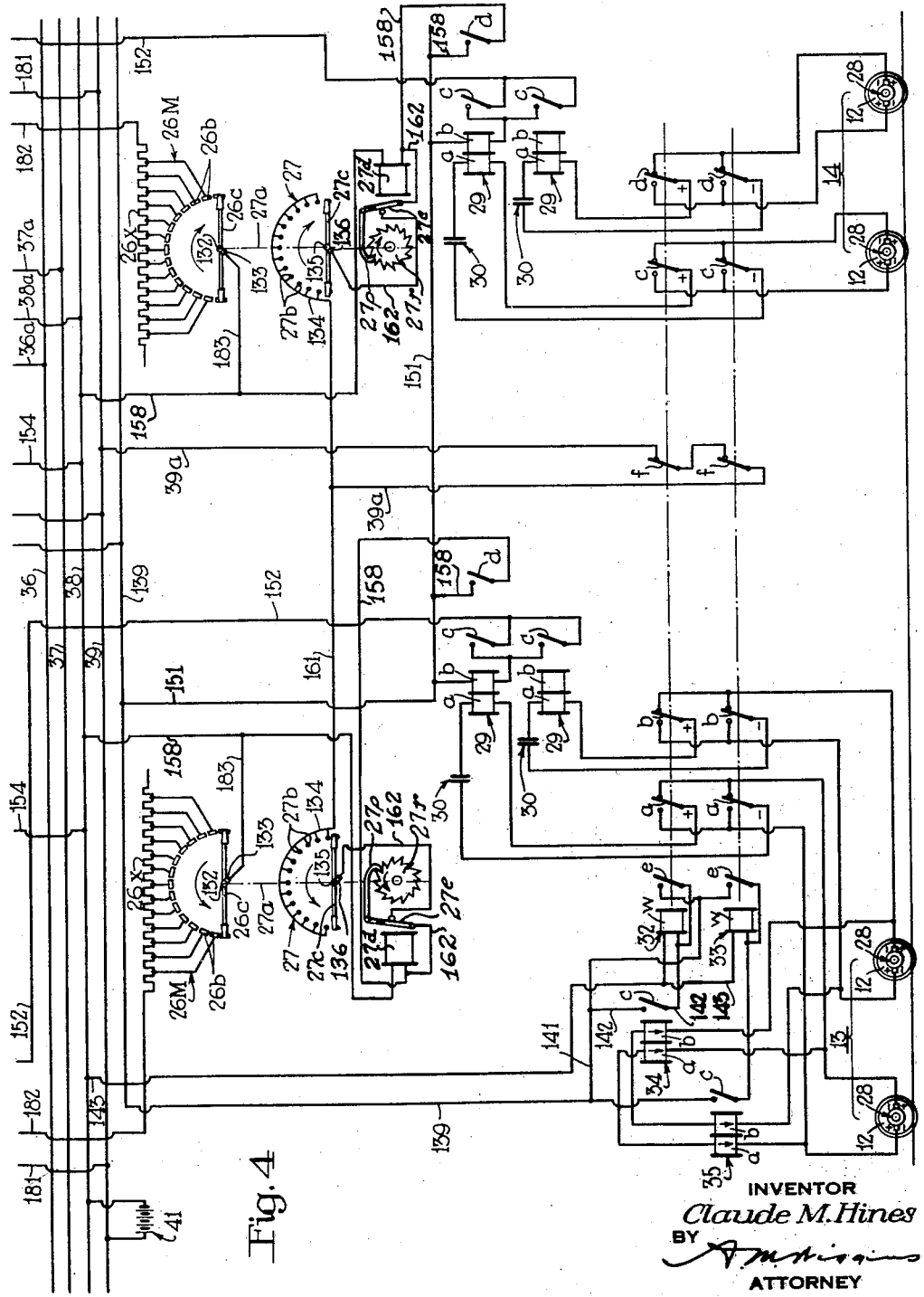

Embodiment Shown in Figs. 3 and 4

The embodiment of my invention shown in Figs. 3 and 4 is for the most part identical to the apparatus of the first described embodiment, and accordingly a description of such apparatus will not be repeated, it being deemed sufficient merely to identify the corresponding parts, elements and wires by the same reference numerals employed in the first described embodiment.

Essentially, the embodiment shown in Figs. 3 and 4 differs from the first described embodiment in providing a different reapplication control valve device 25A in substitution for the reapplication control valve device 25, and a different rheostat 26M for controlling the reapplication control valve device 25A.

The reapplication control valve device 25A is a modified form of the well-known "M" type of feed valve employed in fluid pressure brake equipment for railway cars and trains. A detailed description and disclosure of the construction of the "M" type feed valve is given in Instruction Pamphlet No. 5032, November 1932 edition, published by the Westinghouse Air Brake Company. Only so much of the details of the reapplication control valve device 25A are shown, therefore, as is necessary to make clear the difference with respect to the standard form of "M" type feed valve.

For purposes of my present invention, it may be stated that the "M" type feed valve is a device which is normally employed to reduce the pressure of the fluid supplied from the main reservoir of fluid pressure brake systems for railway cars and trains to a suitable value at which it is desired to charge the brake pipe. In the standard form of the feed valve, a regulating valve of the poppet type, shown as the valve 171 of the reapplication control valve device 25A is biased to an unseated position by a regulating spring of the coil type, shown as the coil spring 172, a flexible diaphragm shown as the diaphragm 173 in the drawings being interposed between the spring and the valve.

The regulating spring in the standard form of "M" feed valve is adjusted to provide a fixed loading force on the diaphragm 173, such as ninety pounds per square inch, effective to unseat the regulating valve 171 until the pressure of fluid supplied through the feed valve and acting in opposition thereto on the upper side of the diaphragm overcomes the force of the spring to effect seating of the valve. When the regulating valve is seated, associated valve mechanism of the feed valve is thereby operative to limit the pressure of the fluid supplied through the feed valve in accordance with the loading of the regulating spring 172.

According to my invention I have modified the standard "M" type feed valve by providing electro-pneumatic means for controlling the loading of the regulating spring 172. This electro-pneumatic apparatus comprises a piston 174 having a fluid-tight chamber 175 formed at the lower side thereof, which is constantly connected by a branch pipe 176 to the supply reservoir pipe 17. The piston 174 accordingly compresses the regulating spring 172 in accordance with the pressure of the fluid in the supply reservoirs 23. This pressure is customarily of the order of one hundred and ten pounds per square inch. The piston 174 has a non-magnetic stem 179, to the end of which is secured a magnetic plunger 177 forming part of a solenoid device having a winding 178.

The arrangement of the solenoid device is such that when the winding 178 is energized the magnetic pull on the plunger 177 is exerted in a direction to oppose the force of the supply reservoir pressure acting on the piston 174, thereby diminishing the effective force of the piston to load or compress the regulating spring 172.

It will accordingly be apparent that by increasing the degree of energization of the magnet winding 178 of the solenoid device, the degree of loading of the regulating spring 172 is correspondingly diminished. The pressure delivered through the feed valve or reapplication control valve 25A is thus limited automatically and inversely according to the degree of energization of the magnet winding 178. In other words, the maximum pressure supplied by the reapplication control valve 25A decreases as the energization of the magnet winding 178 increases.

When the supply reservoir pressure in the chamber 175 beneath the piston 174 is reduced to atmospheric pressure the piston is urged downwardly by the regulating spring 172 into engagement with an annular stop shoulder 179 formed inside the tubular portion of the casing. The location of the stop shoulder 179 is such as to maintain at least a certain degree of compression of regulating spring 172.

The rheostat 26M is provided for controlling the degree of energization of the magnet winding 178 of the reapplication control valve 25A. The rheostat 26M differs from the rheostat 26 in having a resistor 26x, which differs from the resistor 26a in that the resistance thereof is suitably designed in conformity with the electrical characteristics of the magnet winding 178, which are different than that of magnet winding 111 of reapplication control valve 25. Moreover, the tap connections from the resistor 26x to the end contact segments 26b are omitted so that in the horizontal or normal position of the contact arm 26c, the circuit through the resistor 26x of the rheostat is not closed as in the case of the rheostat 26.

The contact arm 26c of rheostat 26M is fixed on the rotating shaft 27a of stepping relay 27, and is operated in exactly the same manner thereby as is the contact arm 26c of the rheostat 26, in response to slipping of the vehicle wheels.

It will be seen, therefore, that when the brakes are initially applied, the pressure of fluid supplied to the decelostat valves 19 is the maximum in accordance with the operation of the relay valve 21, because the magnet winding 178 of the reapplication control valve 25A is deenergized due to interruption of the circuit of the magnet winding 178 at the rheostat 26M.

When a wheel slipping condition occurs for the first time during a brake application and the stepping relay 27 advances the contact arm 26c of the rheostat 26M one step in the operating direction, a circuit is completed for energizing the magnet winding 178 of the corresponding reapplication control valve 25A to a minimum degree. This energizing circuit extends from the positive battery wire 39 by way of a wire 181, the magnet winding 178, a wire 182, resistor 26x, contact arm 26c of rheostat 26M, collector ring 132, brush 133, a wire 183, and wire 158 to the negative battery wire 38.

The resistance of the resistor 26x is such that when the entire resistor is included in circuit with the magnet winding 178 of the reapplication control valve 25A, the solenoid exerts an increment of force in opposition to the supply reservoir pressure acting on the piston 174 so as to diminish the force of the regulating spring 172 by a predetermined amount, such as ten per cent. Accordingly, when the decelostat valve 19 is restored to its normal position following the wheel slip condition, the pressure of fluid supplied to the control chamber of the relay valve section, 19b of the decelostat valve is correspondingly limited to a value which is ten per cent lower in value than that to which such pressure was previously limited. Thus, if the maximum pressure initially delivered through the reapplication control valve 25A was one hundred pounds per square inch, then the maximum pressure delivered to the decelostat valve 19 following the first wheel slip cycle will be reduced ten per cent to ninety pounds per square inch.

Upon each successive wheel slip cycle, the stepping relay 27 is operated as in the first embodiment to cause the rheostat arm 26c of the rheostat 26M to be advanced one step in the operating direction, to thereby cut out successive increments (preferably of uniform amount) of the resistor 26x so as to effect successive corresponding increments of increase in the degree of current energizing the magnet winding 178 of the reapplication control valve 25A. Accordingly, with each successive increment of increase in the current energizing the magnet winding 178, the maximum pressure suppliable through the reapplication control valve 25A to the corresponding decelostat valve 19 is reduced a given amount, such as ten per cent.

A one-way or check valve 124 is provided in parallel relation to each of the reapplication control valves 25A for the same reason employed in connection with the reapplication control valve 25, namely, to enable the rapid release of the brakes.

In view of the fact that the apparatus disclosed in Figs. 3 and 4 functions in other respects than that above described in exactly the same manner as in the first described embodiment, it is believed unnecessary to further describe the operation of the apparatus.

EMBODIMENT SHOWN IN FIGS. 5 AND 6

Figure 5:
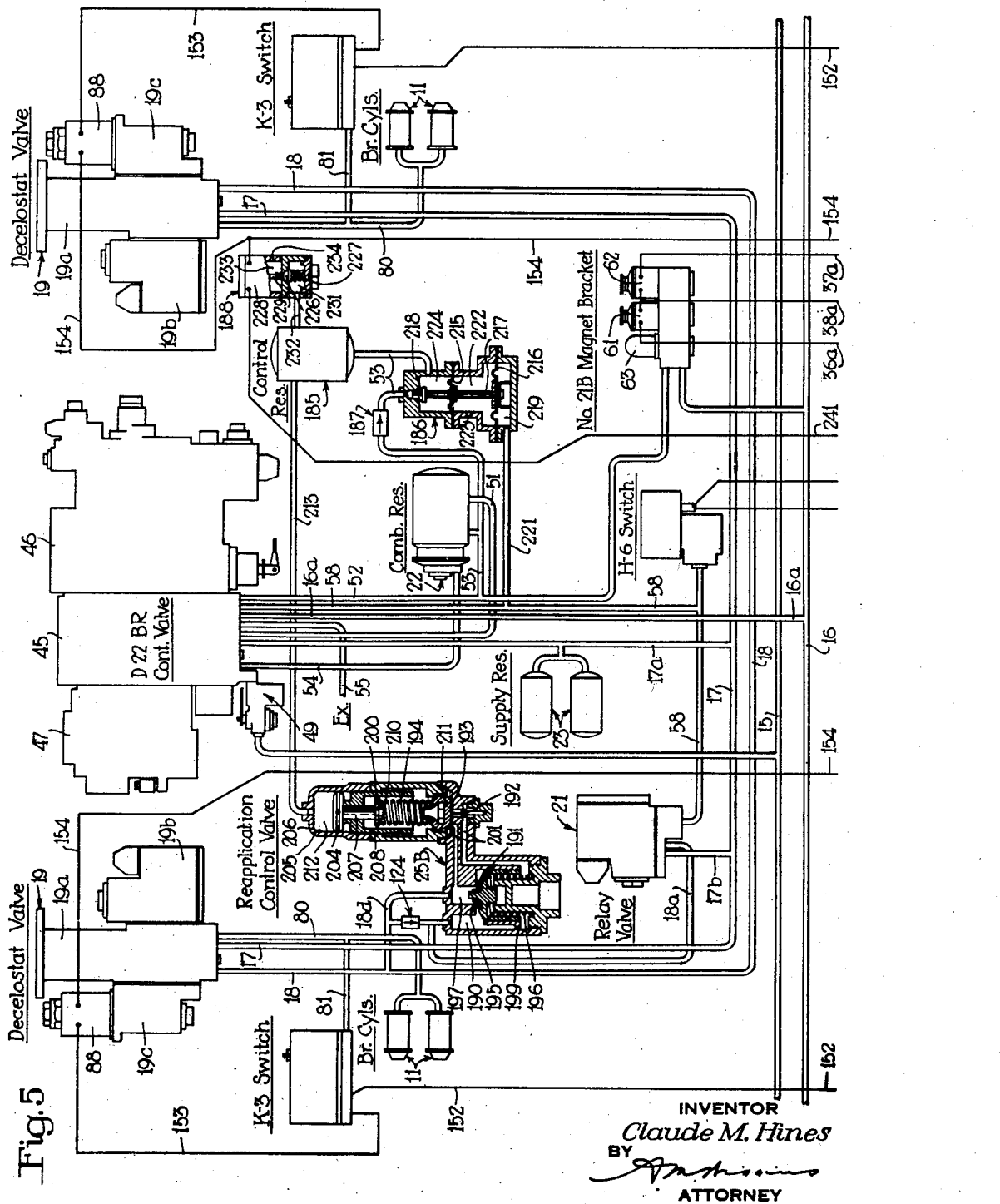

The embodiment of my invention shown in Figs. 5 and 6 is identical, for the most part, to the first described embodiment shown in Figs. 1 and 2. Accordingly, those parts, elements and wires of the present embodiment which are identical to or the equivalent of corresponding parts in the first described embodiment are designated by the same reference numerals without further description.

Essentially, the embodiment shown in Figs. 5 and 6 differs from the previous two embodiments in providing apparatus which functions automatically to reduce the degree to which the brakes are reapplied following a wheel slip condition, which apparatus does not employ stepping relays and rheostats operated thereby. Thus, as seen in Fig. 6, the stepping relays 27 and rheostats 26 or 26M are omitted.

The reapplication control apparatus of the present embodiment differs further from that of previous embodiments in that it comprises a different reapplication control valve 25B and a pneumatic control mechanism for controlling the reapplication control valve instead of stepping relays. The pneumatic control mechanism comprises a control volume or reservoir 185, a cut-off valve device 186, a one-way or check valve 187, and a magnet valve 188.

The reapplication control valve 25B is a modified form of the well-known standard brake cylinder pressure limiting valve, described in detail in Instruction Pamphlet T-5051-11, January 1933 edition, published by the Westinghouse Traction Brake Company.

Referring to Fig. 5, the reapplication control valve 25B comprises a suitable casing containing a supply valve 191, and a regulating valve 192 for controlling the operation of the supply valve 191 according to the degree of loading on a diaphragm 193 effected by a regulating spring 194.

The supply valve 191 is in the form of a valve piston that is urged into seated relation on an annular rib seat 195 by a coil spring 196, the outer seated area of the valve 191 being open to a chamber 190 to which the delivery pipe 18a of the relay valve 21 is connected. The inner-seated area of valve 191 is open to a chamber 197 that is connected by a pipe 18d to the decelostat valve pipe 18 leading to the decelostat valves 19 for both wheel trucks. A one-way or check valve 124 is arranged in parallel relation to the supply valve 191 in the same manner as in the previous embodiments and for a similar purpose.

The chamber on the side of the valve piston 191 on which the spring 196 acts is connected to the chamber 190 at the outer seated area of the valve piston through a suitable restricted port or choke passage 199.

The regulating valve 192 is in the form of a poppet valve controlling communication through a passage 201 connecting the chamber at the spring side of the valve piston to the chamber 197.

The diaphragm 193 is subject to the force of the regulating spring 194 urging it in a direction to unseat the regulating valve 192, and to the pressure of the fluid in chamber 197 transmitted through the passage 201, opposing the force of the spring 194. Seating of the regulating valve 192 occurs when the pressure in the chamber 197 corresponds substantially to the degree of loading of the spring 194.

With the regulating valve 192 unseated, the supply of fluid at high pressure into the chamber 190 from the relay valve 21 causes the valve piston 191 to be unseated because of the differential fluid pressure built-up on the valve piston. The differential fluid pressure is built-up on the valve piston because the rate of supply of fluid under pressure through the choke passage 199 to the spring side of the valve piston is less than the rate of flow of fluid under pressure from the chamber at the spring side of the valve piston past the regulating valve 192 to chamber 197. The differential pressure thus built-up on the valve piston is effective to unseat the valve piston, and then act over the entire inner and outer seated areas of the valve piston to maintain the valve piston unseated.

When the pressure of the fluid built-up in the chamber 197 and flowing through the pipe 18d and decelostat valve pipe 18 to the decelostat valves 19 corresponds to the degree of loading of the regulating spring 194, the diaphragm 193 is flexed upwardly to seat the regulating valve 192. The exhaust of fluid under pressure from the chamber at the spring side of the valve piston 191 is thus stopped and the pressure thus rapidly builds up in the chamber on the spring side of the valve piston until it balances the supply pressure in the chamber 190. With the fluid pressure on opposite sides of the valve piston 191 thus balanced, the spring 196 is effective to seat the valve piston 191, thus causing further supply of fluid under pressure to the decelostat valves 19 to be terminated.

It will thus be seen that the reapplication control valve 25B functions automatically to limit the maximum pressure of the fluid supplied from the relay valve device 21 to the decelostat valves 19 in accordance with the degree of loading or compression of the regulating spring 194.

According to my invention the conventional brake cylinder pressure limiting valve is modified by the addition of a movable abutment in the form of a piston 204 that operates in a suitable bore 205 provided in the usual screw cap 206 associated with the regulating spring portion of the casing. The piston 204 has a stem 207 which is guided in a screw 208 having threaded engagement with the interior of the bore 205 and the bore of the casing containing the regulating spring 194, which screw is locked in position by the engagement of the screw cap 206 with the end of the casing.

The stem 207 of the piston 204 has a suitable collar 209 secured thereto, as by a nut 210, for engaging the end of the regulating spring 194 opposite to that which engages the follower 211 at one side of the flexible diaphragm 193.

The chamber 212 formed at the upper side of the piston 204 is constantly connected by a pipe 213 to the control reservoir 185 so that the piston 204 exerts a loading force on the regulating spring 194 proportional to the pressure maintained in the reservoir 185.

The reservoir 185 is charged to the pressure to which the auxiliary reservoir 22b in the combination reservoir 22 is charged. As will be apparent in Fig. 5, the reservoir 185 is connected to the auxiliary reservoir 22b through an extension of pipe 53 including in series relation therein the cut-off valve 186 and the check valve 187. The check valve 187 is connected and arranged in such a manner as to permit the supply of fluid under pressure to the reservoir 185 and to prevent the reverse flow of fluid under pressure therepast.

The cut-off valve 186 comprises a suitable sectionalized casing having two movable abutments in the form of flexible diaphragms 215 and 216, fixed on a common shaft 217 carrying a valve 218 of the poppet type. The diaphragm 215 is small in area relative to the area of the diaphragm 216 for a reason which will be made apparent presently. The chamber 219 on the outer face of the large diaphragm 216 is constantly connected by a pipe 221 to the relay valve pipe 58. The chamber 219 is thus charged to the same pressure as that of the fluid suppplied to the relay valve device 21 whenever a brake application, of either the automatic or electro-pneumatic type is effected.

The chamber 222 between the two diaphragms 215 and 216 is open to atmosphere through a port 223 at all times.

The chamber 224 formed at the outer face of the smaller diaphragm 215 is connected at all times through one section of the pipe 53 to the reservoir 185.

The poppet valve 218 carried by the stem 217 is located in the chamber 224 in a manner to be actuated to a seated position to close off the supply of fluid under pressure from the auxiliary reservoir 22b through the pipe 53 to the reservoir 185 whenever a brake application is initiated and fluid at a low pressure is correspondingly supplied to the chamber 219 at one side of the larger diaphragm 216.

The diaphragm 216 is of larger area than diaphragm 215 in order that a low pressure in the chamber 219 acting on the larger diaphragm may overcome the normal pressure in the chamber 224 acting on diaphragm 215 to effect seating of the valve 218.

Thus, whenever a brake application is initiated, the cut-off valve device 186 isolates the reservoir 185 from the auxiliary reservoir 22b and maintains it isolated from the auxiliary reservoir throughout the brake application.

The magnet valve device 188, as diagrammatically shown in Fig. 5 is a standard form of magnet valve device having a poppet valve 226 which is normally biased to a seated position by a coil spring 227 and actuated to an unseated position only upon energization of a magnet winding or solenoid 228 acting through a plunger 229.

When the valve 226 is unseated it establishes communication between a chamber 231, that is constantly connected to the reservoir 185 by a pipe 232, and a chamber 233 that is constantly open to atmosphere through an exhaust port 234. The exhaust port 234 has a selected flow area designed to effect reduction of the pressure in the reservoir 185 at a relatively low rate. Thus, assuming that the reservoir 185 is charged to a pressure of one hundred pounds per square inch at the time a brake application is initiated, unseating of the valve 226 of the magnet valve 188 causes a certain reduction of the pressure in reservoir 185 such as ten pounds per square inch, during the time that a wheel slip condition exists.

The magnet winding 228 of the magnet valve device 188 is energized in response to the pick-up of any of the decelostat relays 29, and is maintained energized as long as any of the decelostat relays remain picked-up. In this connection, the front contact d of the decelostat relay 29 of each wheel truck is employed for controlling the circuit of the magnet winding 228 of the magnet valve device 188 instead of controlling the circuit of the magnet winding 27d of the stepping relays 27, as in previous embodiments.

The circuit for energizing the magnet winding of the magnet valve device 188 extends from bus wire 139, which is connected to the positive battery wire 39 under the control of the H—5 switch only when the brakes are applied as in previous embodiments, by way of the branch wire 151, through either one or both of the parallel-connected contacts d of the two corresponding decelostat relays 29 of each wheel truck, to a wire 241 and thence through magnet winding 228 of the magnet valve 188, and the wire 154 back to the negative battery wire 38.

While the operation of the reapplication control apparatus of the present embodiment should now be apparent from the above description, a brief summary of the operation is believed desirable. When an application of the brakes is initiated, and fluid under pressure correspondingly supplied to the relay valve pipe 58, the cut-off valve device 186 is operated in response to a low pressure to cut-off the further supply of fluid under pressure to the reservoir 185. The fluid pressure in the reservoir 185, which corresponds initially to the normal pressure to which the auxiliary reservoir 22b is charged, acts on the piston 204 of the reapplication control device 25B to compress the regulating spring 194 a maximum amount so that it exerts maximum loading pressure on the regulating valve 192.

Fluid under pressure supplied to the decelostat valve pipe 18 in response to the operation of the relay valve device 21, is accordingly unlimited by the reapplication control valve 25B because the pressure of the reservoir 185 is sufficient to condition the reapplication control valve 25B to permit a maximum pressure such as one hundred pounds per square inch to be supplied to the decelostat valves 19.

When slipping of the wheels of either of the wheel trucks occurs, the pick-up of the corresponding decelostat relay 29 establishes the circuit previously traced for energizing the magnet winding of the magnet valve device 188. As will be recalled from description of the operation of the first described embodiment, the decelostat relay 29 is maintained in a picked-up position through a self-holding circuit until the corresponding K—3 switch interrupts the holding circuit in response to the reduction of brake cylinder pressure below fifteen pounds per square inch. It will thus be apparent that the magnet winding of the magnet valve device 188 is maintained energized during substantially the entire slipping cycle.

As previously indicated, the amount of the reduction of the pressure in reservoir 185 effected during a slipping cycle corresponds to a given percentage of the original pressure established in the reservoir, being of the order of substantially ten pounds per square inch. Accordingly, the reapplication control valve 25B is conditioned by the reduction of the pressure in the chamber 212 at one side of the piston 204 to limit the pressure of the fluid resupplied to the decelostat valves 19 from the relay valve 21 to a value which is correspondingly lower than that supplied prior to the occurrence of the initial wheel slip condition.

Thereafter, the pressure in the reservoir 185 is reduced in steps with each succeeding wheel slip cycle during any one brake application. In each instance, the reapplication control valve 25B is reconditioned automatically to limit the pressure of the fluid resupplied from the relay valve 21 to the decelostat valves 19 to a lower value than before the occurrence of the slipping cycle.

It will be seen that since the reapplication control valve 25B controls the pressure of fluid supplied to both decelostat valves 19, the degree of application of the brakes on a truck of the same car on which wheels did not slip, is automatically reduced, upon reapplication of the brakes on the wheels of the truck having wheels which slipped, to the same degree to which the brake application is limited on the truck having the slipping wheels. This is not the case in the first two embodiments for the reason that in the first two embodiments a separate reapplication control valve is provided for each wheel truck. The present embodiment accordingly reduces the degree of brake application on the wheels of a truck other than those of a truck on which slipping occurred. This forestalls the possibility of slipping of wheels on a truck before it can occur.

When the brakes are released, fluid under pressure is released from the relay valve pipe 58, in the manner previously described, and thus from the chamber 219 at the outer face of the larger diaphragm 216. The fluid pressure in the reservoir 185 acting in chamber 224 on the smaller diaphragm 215 is thus effective to restore the valve 218 to its unseated position to restore the charging communication through the check valve 187 from the auxiliary reservoir 22b to the reservoir 185. The reservoir 185 is thus recharged to its normal pressure prior to a succeeding brake application.

It will be observed that when the brakes are being released, the fluid pressure of the reservoir 185 acting on the piston 204 is increasing while the pressure in the chamber 190 of the reapplication control valve 25B is reducing due to the operation of the relay valve device 21. Due to the increased loading of the regulating spring 194, the regulating valve 192 is unseated, thus connecting the chamber 197 to the chamber on the spring side of valve piston 191. A differential fluid pressure is thus built-up on the valve piston 191 effective to maintain it seated because the pressure of the fluid on the spring side of the valve piston is reduced at a restricted rate through the choke passage 199 whereas the pressure of the fluid in the chamber 190 decreases at a rapid rate. It follows, therefore, that the valve piston 191 will remain seated upon the release of fluid under pressure by operation of the relay valve device 21, so that the reduction of the pressure in the control chamber 77 of the decelostat valves 19 would be effected at a relatively slow rate determined by the size of the choke passage 199 except for the check valve 124. The check valve 124 is arranged to permit a rapid reduction of the pressure from the control chamber 77 of the relay valve section 19b of the decelostat valves in by-passing relation to the reapplication control valve 25B, thereby enabling a rapid release of the brakes in correspondence with the rapid reduction of pressure in the relay valve pipe 58.

In view of the fact that the operation of the apparatus comprising the embodiment shown in Figs. 5 and 6 is identical in other respects to that of the previous embodiments, no further description of the operation of this embodiment is believed necessary.

EMBODIMENT SHOWN IN FIG. 7

In Fig. 7 there is shown a modification of the pneumatic reapplication control apparatus of the embodiment in Figs. 5 and 6. For convenience and simplification, only so much of the apparatus is shown in Fig. 7 as is necessary to point out the differences with respect to the embodiment shown in Figs. 5 and 6, corresponding parts and devices being designated by the same reference numerals in the two embodiments. Only so much of Fig. 7 as differs from the embodiment shown in Figs. 5 and 6 will therefore be described.

In a manner similar to that of the embodiment shown in Figs. 5 and 6, the reapplication control valve device 25B is variously conditioned according to the pressure in a control reservoir 185. The embodiment shown in Fig. 7 differs from that in Figs. 5 and 6 in providing a different manner of charging the control reservoir 185 so that it is charged initially in accordance with the degree of brake application initiated and not to the standard normal pressure of the auxiliary reservoir. The reason for the different manner of charging the reservoir 185 will be explained more fully hereinafter.

In Fig. 7, charging of the reservoir 185 is effected in response to operation of the relay valve 21 whenever fluid under pressure is supplied through the relay valve pipe 58 to the relay valve 21 upon initiation of a brake application. Fluid under pressure supplied through pipe 18a from the relay valve 21 to the reapplication control valve 25B also flows through an extension of the pipe 18a to the control reservoir 185. The supply of fluid under pressure through the portion of the pipe 18a leading to the reservoir 185 is under the control of a cut-off magnet valve 251.

A vent magnet valve 188, connected to the reservoir 185 by the pipe 232 and functioning in exactly the same manner as the magnet valve 188 of the embodiment shown in Figs. 5 and 6, is also provided.

Associated with the cut-off magnet valve 251 is a simple relay of the neutral type hereinafter designated the "stick" relay 252. Relay 252 has a winding $a$ and a single front contact $b$.

One of each pair of decelostat relays 29 provided for each wheel truck employs an additional front contact $e$ for controlling the cut-off magnet valve 251 and the stick relay 252 in a manner to be presently described.

The cut-off magnet valve 251 is a standard type magnet valve having a valve 254 of the poppet type biased normally by a coil spring 255 to an unseated position and actuated in response to energization of a magnet winding or solenoid 256 into seated position. In its unseated position, the valve 254 opens communication through that section of the pipe 18a leading to the reservoir 185, to permit charging of the reservoir. When the valve 254 is seated, communication through the pipe 18a to the reservoir is closed and the supply of fluid under pressure to charge the reservoir 185 thus cut-off.

The winding $a$ of the stick relay 252 is connected in parallel with the magnet winding 256 of the magnet valve 251 and is energized, to cause actuation of the front contact $b$ of the relay to its picked-up or closed position, whenever the magnet winding 256 is energized. The magnet winding 256 of the cut-off magnet valve 251 is energized under the control of the front contact $e$ of the two corresponding decelostat relays 29 of each wheel truck. This circuit may be traced from the positive battery wire 39 through the H—6 switch to the positive bus wire 139, thence in parallel through either one or both of the contacts $e$ of the two decelostat relays 129 to a wire 261, thence in parallel through the winding $a$ of the stick relay 252 and the magnet winding 256 of the cut-off magnet valve 251 to a wire 262 which is connected to the negative battery wire 38.

The front contact $b$ of the stick relay 252 is effective in its picked-up or closed position to establish a self-holding circuit for the relay and a holding circuit for the magnet winding 256 of the magnet valve 251. This circuit will be apparent from the fact that the contact $b$ of the stick relay 251 is included in a wire 263 connecting the positive bus wire 139 to the wire 261. Thus, whenever the relay 252 is picked-up, the relay 252 is maintained picked-up thereafter and the magnet winding 256 of the magnet valve 251 is maintained energized until such time as the H—6 switch is opened in response to the release of the brakes.

The vent magnet valve 188 is controlled severally by the front contacts $d$ of the two decelostat relays 29 in exactly the same manner as in the embodiment shown in Figs. 5 and 6 and therefore requires no further description.

It will thus be understood that the reapplication control device 25B in Fig. 7 is conditioned initially in accordance with the pressure of the fluid supplied to effect an application of the brakes so as to permit the supply of fluid under pressure from the relay valve 21 to the decelostat valves 19 in accordance with the pressure of the fluid supplied through pipe 58 to the relay valve 21. The control reservoir 185 is charged at a more rapid rate than fluid under pressure is supplied to the decelostat valves 19 through the reapplication control valve 25B. Thus while the reapplication control valve 25B is being conditioned simultaneously with the supply of fluid under pressure to the decelostat valves 19, there is no delay in supplying fluid under pressure to the decelostat valves.

Whenever a wheel unit on either of the wheel trucks begins to slip, the magnet winding 88 of the corresponding decelostat valve 19 is energized in response to the pick-up of the decelostat relay 29 just as in the previous embodiments. At the same time, the cut-off magnet valve 251 is operated to cut-off the further supply of fluid under pressure to the control reservoir 185 and is "stuck" in its cut-off or closed position by means of the stick relay 252. At the same time also, the vent magnet valve 188 is operated to cause venting of fluid under pressure from the control reservoir 185 as long as the decelostat relay or relays remains picked-up. As in the previous embodiment, the pressure in the reservoir 185 may be reduced approximately ten pounds per square inch during the interval of time that a wheel unit is slipping.

When the slipping wheel unit has been restored to a speed corresponding to car speed and magnet winding 88 of the decelostat valve deenergized in response to opening of the corresponding K—3 switch, so that the decelostat valve is operated to resupply fluid under pressure to the corresponding brake cylinders, the reapplication control valve 25B is effective to limit the pressure of fluid supplied through the decelostat valve pipe 18 from relay valve 21 to a value which is less than the value intially supplied to the decelostat valves, in proportion to the reduction of the pressure in the control reservoir 185.

Each succeeding time that a decelostat relay 29 is picked-up during any given brake application, the vent magnet valve 188 is caused to operate to further reduce the pressure in the control reservoir 185 and thereby condition the reapplication control valve 25B to limit the pressure of fluid resupplied to the decelostat valves 19 to a lower value than that prior to a given slip cycle.

It is to be noted that the arrangement disclosed in Fig. 7 has an advantage, not possessed by the embodiment shown in Figs. 5 and 6, arising from the fact that the control reservoir 185 is initially charged only to the pressure corresponding to the degree of application effected. As pointed out in connection with the previous embodiment, it was necessary for two or three successive slipping cycles to occur during a service application of the brakes in order that the reapplication control valve 25B effect a limitation of the pressure in the brake cylinders, on reapplication of the brakes following a slip cycle, to a value lower than the pressure initially established during the service application of the brakes.

While not intolerable, such unnecessary slipping cycles are to be avoided, if possible, in the interest of greater economy in consumption of fluid under pressure as well as decreased wear on the rims of the car wheels. The arrangement disclosed in Fig. 7 functions to this end by causing a limitation of the pressure of fluid resupplied to the brake cylinders following the first slipping cycle during a service application of the brakes to a value which is lower than that initially effected.

In view of the detailed description of the operation of the pneumatic reapplication control apparatus in the previous embodiment, it is believed that further description of the present embodiment is unnecessary.

SUMMARY

Summarizing, it will be seen that I have disclosed various embodiments of my invention relating to vehicle brake control systems including apparatus responsive to the slipping condition of vehicle wheels for effecting a rapid reduction in the degree of application of the brakes associated with the slipping wheels and a subsequent reapplication of the brakes in a controlled manner substantially at the time the slipping wheels are restored to vehicle speed.

One of the novel features of all embodiments is the provision of means whereby the ultimate degree to which the brakes may be reapplied following a slipping cycle is reduced a certain amount below the limit existing before the slipping cycle. The number of slipping cycles which may occur during any one brake application is thus automatically limited to a relatively low number because the degree to which the brakes are reapplied is reduced ultimately below a degree which will produce slipping. In the case of emergency applications of the brakes, the degree to which the brakes may be reapplied following the first slipping cycle is limited in all embodiments to a lower value than the maximum degree effected initially. In the case of service applications of the brakes, a plurality of slipping cycles may occur in all except one of the embodiments, before the degree to which the brakes may be reapplied is reduced below that established initially. In this one exception, the reapplication of the brakes is limited to a degree less than that initially established immediately upon the occurrence of the first slipping cycle, in both service and emergency applications of the brakes.

Two of the embodiments employ reapplication control valve devices having electro-responsive means, the degree of energization of which is varied automatically by means of a rheostat operated by a stopping relay in response to each slipping cycle, the pressure of the fluid resupplied to effect reapplication of the brakes following each wheel slip cycle being successively reduced with each increment of change in the degree of energization of the electro-responsive portion of the reapplication control valve device.

In two other embodiments, pneumatic control mechanism is provided for variously conditioning a reapplication control valve device to limit to different degrees the pressure of the fluid supplied to effect reapplication of the brakes, the pneumatic control mechanism being operative to effect reduction of a control pressure for the reapplication control valve device during the interval of time that a wheel slip cycle occurs.

Also included in the invention is an arrangement for controlling the reversing switches of the electrical apparatus for detecting the slipping condition of the vehicle wheels. The reversing switches are selectively controlled by corresponding unidirectional relays of the multiple-coil type, each of the coils being energized by a different axle-driven generator. Operation of the unidirectional relays in accordance with the polarity of the voltage supplied by the axle-driven generators and the direction of rotation of the wheels is thus positively assured, notwithstanding the failure of either one of the generators.

Having now described my invention, what I claim as new and desire to secure by Letters Patent, is:

1. In a vehicle brake control system, the combination of means effective upon the slipping of a wheel of the vehicle due to braking for effecting a reduction in the degree of application of the brakes associated with said wheel and a subsequent increase in the degree of application of the brakes associated with said wheel; reapplication control means, including electro-responsive means for limiting the degree to which application of the brakes may be increased following the slipping of said wheel to any one of a plurality of different values depending upon the degree of energization of said electro-responsive means, and means effective upon the occurrence of each of a plurality of successive slipping cycles of said wheel during any one brake application for successively varying the degree of energization of said electro-responsive means in a manner to cause said reapplication control means to limit the degree to which the brake application is increased to successively lower values.

2. In a fluid pressure brake control apparatus, for railway cars and trains, of the type having means under the control of the operator for effecting service or emergency applications of the brakes, the combination of means effective upon the slipping of a wheel of the car or train, during either a service or an emergency application of the brakes, to effect a reduction in the degree of application of the brakes associated with said wheel and a subsequent increase in the degree of application of the brake associated with said wheel, application control means variously conditionable to limit the degree to which the application of the brakes may be increased to any one of a plurality of different degrees, and means effective in response to the first slipping cycle during an emergency application of the brakes for conditioning the reapplication control means to limit the degree of reapplication of the brakes to a value lower than that in effect at the time the slipping occurs, said last means being effective only in response to a plurality of successive slipping cycles during a service application of the brakes for conditioning the reapplication control means to limit the degree of brake reapplication to a value lower than that in effect at the time the first slipping cycle occurs.

3. In a vehicle brake control apparatus, the combination of means effective upon the slipping of a wheel of the vehicle due to braking to effect a reduction in the degree of application of the brakes and a subsequent increase in the degree of application of the brakes associated with said wheel, and means effective only upon the occurrence of predetermined number of successive slipping cycles during a given brake application for limiting the degree to which the application of the brakes may be increased on reapplication of the brakes to a value lower than that in effect at the time the first slipping cycle occurs.

4. In a vehicle brake control apparatus, the combination of means effective upon the slipping of a wheel of the vehicle due to braking to effect a reduction in the degree of application of the brakes and a subsequent increase in the degree of application of the brakes associated with said wheel, reapplication control means for controlling the degree to which the brakes may be reapplied, and means effective only after a plurality of successive slipping cycles has occurred during a given brake application for controlling said reapplication control means in a manner to cause it to limit the degree to which the brakes may be reapplied to a value lower than that in effect at the time the first slipping cycle occurs.

5. In a fluid pressure brake control apparatus, for railway cars and trains, of the type in which service applications or emergency applications of the brakes are effected under the control of the operator, the combination of means effective upon the slipping of a wheel of the vehicle due to braking to effect a reduction in the degree of application of the brakes and a subsequent increase in the degree of application of the brakes associated with said wheel, reapplication control means normally conditioned to permit the application of the brakes to the maximum degree effected during an emergency application of the brakes and variously conditionable to limit the degree of application of the brakes to any one of a plurality of different degrees lower than said maximum degree, and means effective in response to the first and succeeding slipping cycles of said wheel during an emergency application of the brakes for controlling the condition of the reapplication control means so as to cause it to limit the degree of reapplication of the brakes to values successively lower than that immediately prior to the particular slipping cycle and effective only after a plurality of successive slipping cycles has occurred during a given service application of the brakes for so controlling the condition of the reapplication control means as to cause it to limit the degree to which the brakes may be reapplied to a value lower than that in effect at the time the first slipping cycle occurs.

6. In a vehicle brake control system, the combination of means operative upon the slipping of a wheel of the vehicle for effecting a rapid reduction in the degree of application of the brakes associated with said wheel and a subsequent increase in the degree of application of the brakes associated with said wheel, reapplication control means variously conditionable to limit the degree to which the brakes associated with said wheel may be increased to any one of a plurality of different degrees, and an electro-magnetically operated stepping relay operatively advanced in step-by-step manner in response to successive slipping cycles of said wheel for varying the condition of said reapplication control means in a manner to limit the degree to which the brakes may be reapplied to successively lower degrees with successive slipping cycles.

7. In a vehicle brake control system, combination of means operative upon the slipping of a wheel of the vehicle for causing a rapid reduction in the degree of application of the brakes associated with said wheel and a subsequent increase in the degree of application of the brakes associated with said wheel, reapplication control means including electro-responsive means for limiting the degree to which the application of the brakes may be increased depending upon the degree of energization of the electro-responsive means; a rheostat for controlling the degree of energization of said electro-responsive means, and means operative in response to each of a plurality of successive slipping cycles of said wheel during any one brake application for effecting operation of said rheostat in a manner to cause operation of the rheostat to vary the degree of energization of the electro-responsive means so as to cause the reapplication control means to limit the degree to which the application of the brakes may be increased to successively lower values each time a slipping cycle occurs.

8. In a vehicle brake control system, the combination of means operative upon the slipping of a wheel of the vehicle for causing a rapid reduction in the degree of application of the brakes associated with said wheel and a subsequent increase in the degree of application of the brakes associated with said wheel, reapplication control means including electro-responsive means for limiting the degree to which the application of the brakes may be increased to any one of a plurality of different degrees depending upon the degree of energization of the electro-responsive means, a rheostat for controlling the degree of energization of the electro-responsive means, and a stepping relay operatively advanced each time a slipping cycle occurs for correspondingly operating the rheostat to vary the degree of energization of the electro-responsive means in a manner to limit the degree to which the application of the brakes may be increased to successively lower values each time a slipping cycle occurs.

9. In a vehicle brake control system, the combination of means operative upon the slipping of a wheel of the vehicle for causing a rapid reduction in the degree of application of the brakes associated with said wheel and a subsequent increase in the degree of application of the brakes associated with said wheel, a self-lapping magnet valve device for controlling the pressure of fluid supplied to effect application of the brakes according to the degree of energization of the magnet valve device, and means operative automatically in response to each of a plurality of successive slipping cycles during any one brake application to cause successive corresponding reductions in the degree of energization of the magnet valve device whereby the magnet valve device operates to limit the degree to which the pressure of fluid supplied to effect application of the brakes may be increased following each slipping cycle to successively lower values.

10. In a fluid pressure brake control system, for a vehicle the combination of means operative upon the slipping of a wheel of the vehicle due to braking to effect a reduction in the degree of application of the brakes associated with the slipping wheel and a subsequent increase in the degree of application of the brakes associated with said wheel, self-lapping magnet valve means controlling the pressure of fluid supplied to effect application of the brakes in accordance with the degree of energization of the magnet valve means, a rheostat for controlling the degree of energization of said magnet valve means, and means operatively responsive to each of a plurality of successive slipping cycles of said wheel during any one brake application for causing said rheostat to be operated to reduce the degree of energization of said self-lapping magnet valve means to a value lower than that previously existing, so that said self-lapping magnet valve means limits the pressure of the fluid supplied to effect reapplication of the brakes following each slipping cycle to a value lower than that previously existing.

11. In a fluid pressure brake control system, for a vehicle the combination of means operative upon the slipping of a wheel of the vehicle due to braking to effect a reduction in the degree of application of the brakes associated with the slipping wheel and a subsequent increase in the degree of application of the brakes associated with said wheel, self-lapping magnet valve means controlling the pressure of fluid supplied to effect application of the brakes in accordance with the degree of energization of the magnet valve means, a rheostat for controlling the degree of energization of said magnet valve means, and a stepping relay operatively advanced with each of a plurality of successive slipping cycles for causing operation of said rheostat to correspondingly reduce the degree of energization of the self-lapping magnet valve means.

12. In a vehicle brake control system, the combination of means operative upon slipping of a wheel of a vehicle due to braking to effect a reduction in the degree of application of the brakes associated with the slipping wheel and a subsequent increase in the degree of application of the brakes associated with the said wheel, a control reservoir, means for charging said reservoir to a predetermined initial fluid pressure, reapplication control means variously conditionable according to the fluid pressure in said control reservoir for limiting the degree to which the application of the brakes may be increased to any one of a plurality of different degrees depending upon the fluid pressure in said control reservoir, and means responsive to each of a plurality of successive slipping cycles of said wheel during any one brake application for successively reducing the fluid pressure in said control reservoir.

13. In a vehicle brake control system, the combination of means operative upon slipping of a wheel of a vehicle due to braking to effect a reduction in the degree of application of the brakes associated with the slipping wheel and a subsequent increase in the degree of application of the brakes associated with the said wheel, a control reservoir, means effective while the brakes on the vehicle are released for causing said reservoir to be charged with fluid at a certain predetermined pressure, means operative in response to the application of the brakes on the vehicle for cutting off the supply of fluid under pressure to charge said reservoir, means operative in response to each of a plurality of successive slipping cycles of said wheel for successively reducing the pressure of the fluid in said reservoir, and reapplication control means variously conditioned according to the fluid pressure in said reservoir for limiting the pressure of fluid supplied to effect application of the brakes to successively lower values with each succeeding slipping cycle during any one brake application.

14. In a vehicle brake control system, the combination of means effective upon the slipping of a wheel of the vehicle due to braking to effect a reduction in the degree of application of the brakes associated with said wheel and a subsequent increase in the degree of application of the brakes associated with said wheel, a control reservoir, means effective upon application of the brakes to cause charging of said reservoir with fluid at a pressure varying according to the degree of application of the brakes, means effective in response to the occurrence of the first slipping cycle of said wheel during any one brake application to prevent the supply of fluid to said reservoir thereafter during said brake application, means effective in response to each of a plurality of successive slipping cycles for effecting reduction of pressure in said reservoir, and reapplication control means variously conditioned according to the fluid pressure in said reservoir for correspondingly limiting the degree to which the application of the brakes associated with said wheel may be increased to different values.

15. In a vehicle brake control system of the type having a separate brake cylinder associated with each of two different wheel units and effective upon the supply of fluid under pressure thereto to effect application of the brakes on the corresponding wheel unit and upon the release of fluid under pressure therefrom to effect the release of the brakes associated with the corresponding wheel unit, the combination of a control valve for each of said brake cylinders responsive in accordance with the pressure of fluid supplied thereto to cause fluid at a corresponding pressure to be supplied to the corresponding brake cylinder, valve means normally in a position to permit the supply of fluid under pressure to the said control valve and operative to cause a rapid reduction of pressure supplied to the control valve whereby the control valve operates to effect a corresponding rapid reduction of the pressure in the corresponding brake cylinder, a relay valve device operative in accordance with the pressure of fluid supplied thereto to cause fluid at a corresponding pressure to be supplied to both of said control valves, reapplication control valve means variously conditionable to limit the pressure of the fluid supplied from the said relay valve device to said control valves to any one of a plurality of different pressures, means operative in response to the slipping of either of said wheel units for causing operation of the said valve means for the corresponding control valve to effect a rapid reduction of the pressure in the corresponding brake cylinder and a subsequent resupply of fluid under pressure thereto, and means responsive to each of a plurality of succeeding slipping cycles of both of said wheel units for causing said reapplication control means to be conditioned to limit the pressure of fluid supplied to both of said control valves to a pressure lower than that existing prior to the slipping cycle.

16. In a brake control system for a vehicle of the type having two separate wheel units and a separate brake cylinder for each of said wheel units effective upon the supply of fluid under pressure thereto to effect application of the brakes associated with the corresponding wheel unit and upon the release of fluid under pressure therefrom to effect the release of the brakes associated with the corresponding wheel unit, the combination of a control valve for each of said brake cylinders operative at one time in accordance with the pressure of fluid supplied thereto to cause fluid at a corresponding pressure to be supplied to or released from the corresponding brake cylinder and at another time to effect a rapid reduction of the pressure in the corresponding brake cylinder independently of the pressure supplied to the control valve, means responsive to the slipping of either one of the wheel units to cause operation of the corresponding control valve to effect a rapid reduction of the pressure in the corresponding brake cylinder and a subsequent operation of the control valve to resupply fluid under pressure to the brake cylinder, reapplication control means variously conditionable to limit the pressure of the fluid supplied to said control valves to any one of a plurality of different degrees, and means responsive to the slipping of either one or both of said wheel units for causing the reapplication control means to reduce the limit of the pressure supplied to both said control valves each time slipping of either one of said wheel units occurs.

17. In a vehicle brake control apparatus of the type in which the vehicle brakes are applied and released under the control of the operator, the combination of a first generator for supplying a voltage substantially proportional to the rotational speed of one wheel of the vehicle, electroresponsive means operatively responsive to changes in the voltage supplied by said first generator at a rate exceeding a certain rate for effecting a variation in the degree of application of the brakes associated with the corresponding wheel, switch means for rendering the electroresponsive means potentially effective whether the voltage supplied by the first generator is of one polarity or of the opposite polarity, a second generator for supplying a direct-current voltage substantially proportional to the rotational speed of a wheel of the vehicle other than said one wheel and of opposite polarity for opposite directions of rotation thereof, and means controlled in accordance with the degree and the polarity of the voltage supplied by either of said generators for causing operation of said switch means to render the electroresponsive means potentially effective whenever the speed of the vehicle exceeds a certain low speed.

18. In a vehicle brake control apparatus of the type in which the brakes on the vehicle wheels are applied and released under the control of the operator, the combination of a first generator for supplying a direct-current voltage substantially proportional to the rotational speed of one wheel of the vehicle and of opposite polarity for opposite directions of rotation of the wheel, a second generator for supplying a direct-current voltage substantially proportional to the rotational speed of a different wheel of the vehicle and of opposite polarity for opposite directions of rotation of said different wheel, electroresponsive means operatively responsive to changes in the voltage supplied by either of said generators at a rate exceeding a certain rate for effecting a variation in the degree of application of the brakes associated with the corresponding wheels, switch means for rendering the electroresponsive means potentially effective whether the voltage supplied by the generators is of one polarity or of the opposite polarity and means controlled according to the degree and the polarity of the voltage supplied by either of said generators for causing said switch means to render the electroresponsive means potentially effective whenever the speed of the vehicle exceeds a certain low speed.

19. In an apparatus for detecting the rotative condition of vehicle wheels, the combination of electroresponsive means, means for effecting energization of said electroresponsive means according to the rotative condition of a wheel of the vehicle, switch means for rendering said electro-responsive means potentially effective, and a plurality of means separately responsive to the speed of the vehicle and being individually effective to control the switch means.

20. In an apparatus for detecting the rate of change of speed of a vehicle wheel, the combination of a first means for supplying a voltage substantially proportional to the rotational speed of one certain wheel of the vehicle, electroresponsive means operatively responsive according to the rate of change of the voltage supplied by the said first voltage supply means, switch means for rendering said electroresponsive means potentially effective, a second means for supplying a voltage substantially proportional to the rotational speed of a wheel of the vehicle other than said one certain wheel, and means controlled according to the voltage of either the said first voltage supply means or the said second voltage supply means for controlling the operation of said switch means.

21. In an apparatus for detecting the rate of change of speed of a vehicle wheel, the combination of a plurality of voltage supply means each of which supplies a voltage substantially proportional to the rotational speed of a different corresponding wheel of the vehicle, electroresponsive means operatively responsive to changes in the voltage supplied by any of said voltage supply means at a rate exceeding a certain rate, switch means for rendering said electroresponsive means potentially effective to respond to changes in the voltage supplied by any of said plurality of voltage supply means, and means controlled according to the separate voltages delivered by any one of the plurality of voltage supply means for controlling said switch means to render said electroresponsive means potentially effective when the speed of the vehicle exceeds a certain low speed.

22. In an apparatus for detecting the rate of change of speed of vehicle wheels, the combination of a first generator for supplying a direct-current voltage substantially proportional to the rotational speed of one certain wheel of the vehicle and of opposite polarity for opposite directions of rotation of the wheel, a second generator for supplying a direct-current voltage substantially proportional to the rotational speed of a different wheel of the vehicle and of opposite polarity for opposite directions of rotation of the said different wheel, electroresponsive means operatively responsive to changes in the voltage supplied by one of said generators at a rate exceeding a certain rate, reversing switch means for rendering the electroresponsive means potentially effective whether the voltage supplied by the corresponding generator is of one polarity or of the opposite polarity, and means controlled in accordance with the degree and polarity of the separate voltages of either the said first or the said second generator for causing said reversing switch means to render the electroresponsive means potentially effective when the speed of the vehicle exceeds a certain low speed.

23. In an apparatus for detecting the rate of change of speed of vehicle wheels, the combination of a first means for supplying a direct-current voltage substantially proportional to the rotational speed of one wheel of the vehicle and of opposite polarity for opposite directions of rotation of the wheel, electroresponsive means, an electrical condenser, a pair of cooperating reversing relays jointly effective when either of the relays is picked-up to establish a circuit connecting said condenser and electroresponsive means in series relation and subject to the voltage supply means in a manner to provide a constant polarity of impressed voltage notwithstanding a reversal of polarity of the voltage supply means, said electroresponsive means being operatively responsive only to a current exceeding a certain value discharged from said condenser upon a reduction of the voltage supplied by the voltage supply means at a rate exceeding a certain rate, a second means for supplying a direct-current voltage substantially proportional to the rotational speed of a different wheel of the vehicle and of opposite polarity for opposite directions of rotation thereof, and two uni-directional relays controlled according to the degree and the polarity of the voltage supplied by either said first or said second voltage supply means in a manner such that one of said uni-directional relays is picked-up for one direction of rotation of the vehicle wheels and the other of said uni-directional relays is picked-up for the opposite direction of rotation of the vehicle wheels, said one uni-directional relay being effective when picked-up to cause pick-up of one of said reversing relays and the other of said uni-directional relays being effective when picked-up to cause pick-up of the other of said reversing relays.

24. In an apparatus for detecting the rate of change of rotational speed of vehicle wheels, the combination of a first generator for supplying a direct-current voltage substantially proportional to the rotational speed of one wheel of the vehicle and of opposite polarity for opposite directions of rotation of the wheel, a second generator for supplying a direct-current voltage substantially proportional to the rotational speed of a different wheel and of opposite polarity for opposite directions of rotation of said different wheel, an electrical condenser, current-responsive means, reversing switch means operative to control the connection of said condenser and said current-responsive means to one of said generators whereby current is discharged from said condenser in the same direction through the current-responsive means and varying in accordance with the rate of reduction of voltage supplied by said one generator whether the voltage of the said one generator is of one polarity or of the opposite polarity, and means controlled according to the degree and polarity of the voltage supplied by either of said generators for controlling the operation of said reversing switch means.

25. In a fluid pressure brake control system of the type having a brake cylinder for effecting application of the brakes associated with a wheel unit of the vehicle in accordance with the pressure of fluid supplied to the brake cylinder and for effecting release of the brakes upon venting of fluid under pressure from the brake cylinder, the combination of a first relay valve device operatively responsive to a control fluid pressure supplied thereto for causing fluid at a corresponding pressure to be supplied to the brake cylinder, a second relay valve device operatively responsive to a control fluid pressure supplied thereto for supplying fluid at a corresponding pressure constituting the control fluid pressure for the said first relay valve device, valve means interposed in the communication through which the control fluid pressure is supplied from the said second relay valve device to the said first relay valve device in a manner to normally permit the supply of control fluid pressure to said first relay valve device and operative to prevent the supply of control fluid pressure to said first relay valve device and effect a reduction of the control fluid pressure acting on the first relay valve device whereby to effect a corresponding reduction of the pressure in the brake cylinder, and a fluid pressure control valve device interposed in the communication through which the said second relay valve device supplies control fluid pressure to said first relay valve device at a point between said valve means and said second relay valve device for limiting the pressure of the control fluid pressure supplied to the said first relay valve device to any one of a plurality of different values for any given control fluid pressure supplied to said second relay valve device, means effective in response to slipping of the said wheel unit for causing said valve means to be operated in a manner to cause said first relay valve device to reduce the pressure in the brake cylinder below a certain pressure and then restore the pressure in the brake cylinder in accordance with the control fluid pressure restored on said first relay valve device, and means for controlling said fluid pressure control valve device in such a manner as to cause it to limit the control fluid pressure supplied to said first relay valve device following each of a plurality of slipping cycles during a given brake application to a value which is lower than that in effect prior to the slipping cycle.

26. In a fluid pressure brake control system of the type having a brake cylinder for effecting application of the brakes associated with a wheel unit of the vehicle in accordance with the pressure of fluid supplied to the brake cylinder and for effecting release of the brakes upon venting of fluid under pressure from the brake cylinder, the combination of a first relay valve device operatively responsive to a control fluid pressure supplied thereto for causing fluid at a corresponding pressure to be supplied to the brake cylinder, a second relay valve device operatively responsive to a control fluid pressure supplied thereto for supplying fluid at a corresponding pressure constituting the control fluid pressure for the said first relay valve device, valve means interposed in the communication through which the control fluid pressure is supplied from the said second relay valve device to the said first relay valve device in a manner to normally permit the supply of control fluid pressure to said first relay valve device and operative to prevent the supply of control fluid pressure to said first relay valve device and effect a reduction of the control fluid pressure acting on the first relay valve device whereby to effect a corresponding reduction of the pressure in the brake cylinder, and a fluid pressure control valve device interposed in the communication through which the said second relay valve device supplies control fluid pressure to said first relay valve device at a point between said valve means and said second relay valve device for limiting the pressure of the control fluid pressure supplied to the said first relay valve device to any one of a plurality of different values for any given control fluid pressure supplied to said second relay valve device, means effective in response to slipping of the said wheel unit for causing said valve means to be operated in a manner to cause said first relay valve device to reduce the pressure in the brake cylinder below a certain pressure and then restore the pressure in the brake cylinder in accordance with the control fluid pressure restored on said first relay valve device, means for controlling said fluid pressure control valve device in such a manner as to cause it to limit the control fluid pressure supplied to said first relay valve device following each of a plurality of slipping cycles during a given brake application to a value which is lower than that in effect prior to the slipping cycle, and a one-way valve disposed in parallel relation to said fluid pressure control valve device and arranged in such a manner as to permit a reduction of the control fluid pressure supplied to said first relay valve device at a rate in accordance with the rate of reduction of the control fluid pressure supplied to the said second relay valve device.

27. In a vehicle brake control system of the type having a brake cylinder for effecting application of the brakes associated with a wheel unit of a vehicle in accordance with the pressure of the fluid supplied thereto and effective upon the release of fluid under pressure therefrom to effect the release of the brakes, the combination of a relay valve device operatively responsive to the pressure of a control fluid pressure supplied thereto for causing fluid at a corresponding pressure to be supplied to the brake cylinder to effect application of the brakes, valve means controlling the communication through which fluid under pressure is supplied to said relay valve device and operative from a position, in which the supply of fluid under pressure through the communication is permitted, to a different position in which it prevents the supply of fluid under pressure to the relay valve device and causes fluid under pressure to be vented from the relay valve device whereby to effect a reduction of the pressure in the brake cylinder, a pressure control valve device variously conditionable to limit the pressure of the fluid supplied to the said relay valve device to any one of a plurality of different values, and means responsive to a slipping condition of the wheel unit for effecting operation of said valve means to its said different position for a certain length of time and effective to cause a variation in the condition of the pressure control valve device each time a slipping condition of the wheel unit occurs during a given brake application in such a manner that the control valve device is effective to limit the pressure of the fluid supplied to the relay valve device to successively lower values, and a one-way valve in parallel relation to the pressure control valve device so arranged as to permit a reduction of the pressure of the fluid supplied to the said relay valve device, independently of said pressure control valve device.

28. In a vehicle brake control system, the combination of means operative upon the slipping of a wheel unit of the vehicle for effecting a rapid reduction in the degree of application of the brakes associated with said wheel unit and a subsequent increase in the degree of application of the brakes associated with said wheel unit, reapplication control means variously conditionable to limit the degree to which the brakes associated with said wheel unit may be increased to any one of a plurality of different degrees, and a stepping relay operatively advanced in step-by-step manner in response to successive slipping cycles of said wheel unit for causing variation of the condition of said reapplication control means in such a manner that the reapplication control means is effective to limit the degree to which the brakes may be reapplied, following each of a plurality of successive slipping cycles, to a degree that is a substantially uniform amount lower than the degree in effect prior thereto.

29. In a vehicle brake control system of the type in which the brakes associated with the vehicle wheels may be applied and released under the control of the operator, the combination of means operative upon the slipping of a wheel unit of the vehicle for effecting a rapid reduction in the degree of application of the brakes associated with said wheel unit and a subsequent increase in the degree of application of the brakes associated with said wheel unit, reapplication control means variously conditionable to limit the degree to which the application of brakes associated with said wheel units may be increased to any one of a plurality of different degrees, a stepping relay of the rotary type operatively advanced in step-by-step manner in response to successive slipping cycles of said wheel units for varying the condition of said reapplication control means in a manner to limit the degree to which the brakes may be applied following succeeding slipping cycles to successively lower values, and means effective automatically upon the release of the brakes under the control of the operator for restoring said stepping relay to its normal position.

30. In a vehicle brake control system of the type in which the brakes associated with the vehicle wheels may be applied and released under the control of the operator, the combination of means operative upon the slipping of a wheel unit of the vehicle for effecting a rapid reduction in the degree of application of the brakes associated with said wheel unit and a subsequent increase in the degree of application of the brakes associated with said wheel unit, reapplication control means variously conditionable to limit the degree to which the brakes associated with said wheel units may be increased to any one of a plurality of different degrees, a stepping relay of the rotary type operative in only one direction out of a normal position thereof in step-by-step manner in response to successive slipping cycles of said wheel unit for correspondingly varying the condition of said reapplication control means in a manner to limit the degree to which the brakes may be reapplied to successively lower degrees with each successive slipping cycle, and means effective automatically in response to the release of the brakes associated with said wheel unit by the operator for causing operation of said stepping relay in said one direction to the normal position thereof.

31. In a vehicle brake control apparatus, the combination of means operative upon the slipping of a wheel of the vehicle due to braking to effect a reduction in the degree of application of the brakes and a subsequent increase in the degree of application of the brakes associated with said wheel, reapplication control means operative to control the degree of reapplication of the brakes associated with said wheel following a wheel slip cycle, said reapplication control means including means for exerting a control force to condition the reapplication control means so as to limit the degree of reapplication of the brakes to a value varying in accordance with the degree of the control force, and means operative each time said wheel slips during a given brake application, to so control said force exerting means as to effect a substantially uniform variation of the control force and thereby to cause a corresponding reduction in the degree to which the reapplication control means limits reapplication of the brakes associated with said wheel.

32. In a vehicle brake control apparatus of the type having a brake cylinder to which fluid under pressure is supplied to effect application of the brakes and from which fluid under pressure is released to effect release of the brakes associated with a wheel of the vehicle, the combination of means operative in response to the slipping of said wheel due to application of the brakes thereon by said brake cylinder to effect first a rapid reduction of the pressure in the brake cylinder and then an increase of the pressure in the brake cylinder, reapplication control means for controlling the degree of pressure restored in the brake cylinder following a slipping cycle of said wheel, said reapplication control means including means for exerting a control force which conditions the reapplication control means to limit the degree of pressure restored in the brake cylinder in accordance with the control force exerted, means operative in response to the occurrence of each of a plurality of successive slipping cycles of said wheel during a given brake application for effecting a substantially uniform variation of the control force exerted by the force exerting means whereby to cause said reapplication control means to limit the pressure restored in the brake cylinder following each of a plurality of successive slipping cycles during a given brake application to a value that is a certain substantially uniform amount lower than the pressure obtaining prior thereto.

33. In a vehicle brake control apparatus, the combination of means operative upon the slipping of a wheel of the vehicle due to braking to effect a reduction in the degree of application of the brakes associated with the slipping wheel and a subsequent increase in the degree of application of the brakes associated with said wheel, reapplication control means variously conditionable in accordance with the degree of a control force to limit the degree of reapplication of the brakes following a slipping cycle to a degree corresponding to the degree of the control force, and means operatively responsive to each occurrence of a slipping condition of said wheel for effecting a substantially uniform amount of variation in the degree of the control force conditioning the reapplication control means so as to cause it to correspondingly limit the degree of reapplication of the brakes following each of a plurality of successive slipping cycles during any given brake application.

34. In a vehicle brake control apparatus of the type having a brake cylinder to which fluid under pressure is supplied to effect application of the brakes and from which fluid under pressure is released to effect release of the brakes associated with a wheel of the vehicle, the combination of means operative in response to the slipping of said wheel for effecting a rapid reduction of the pressure in the brake cylinder and a subsequent increase of the pressure in the brake cylinder, reapplication control means variously conditioned in accordance with the degree of a control force for correspondingly limiting the pressure restored in the brake cylinder following a slipping cycle, and means operative to effect a substantially uniform variation in the degree of the control force conditioning the reapplication control means each time a slipping condition of the said wheel occurs during a given brake application so as to cause the said reapplication control means to correspondingly reduce the pressure restored in the brake cylinder following each of a plurality of successive slipping cycles during a given brake application with respect to that obtaining prior thereto.

35. In a vehicle brake control apparatus, the combination of means operative upon the slipping of a wheel of the vehicle due to braking to effect a reduction in the degree of application of the brakes associated with said wheel and a subsequent increase in the degree of application of the brakes, reapplication control means including electro-responsive means for variously conditioning the reapplication control means in accordance with the degree of energization thereof to cause the reapplication control means to limit the degree to which the brakes may be reapplied following a slipping cycle to a degree corresponding substantially to the degree of energization of the electro-responsive means, and means responsive to each slipping of said wheel for varying by a substantially uniform amount the degree of energization of the electro-responsive means so that the reapplication control means is thereby conditioned to correspondingly vary the degree to which the brakes may be reapplied following each of a plurality of successive slipping cycles during a given brake application.

36. In a vehicle brake control apparatus of the type having a brake cylinder to which fluid under pressure is supplied to effect application of the brakes and from which fluid under pressure is released to effect release of the brakes associated with a wheel of the vehicle, the combination of means operative in response to the slipping of said wheel for effecting a rapid reduction of the pressure in the brake cylinder and a subsequent increase of the pressure in the brake cylinder, reapplication control means including electro-responsive means for exerting a control force to condition the reapplication control means so as to limit the degree to which the pressure in the brake cylinder may be restored following a slipping cycle to a value corresponding to the degree of energization of the electro-responsive means, and means operative in response to a slipping condition of the said wheel each time a slipping condition occurs during a given brake application for effecting a substantially uniform variation in the degree of energization of the electro-responsive means so as to cause the reapplication control means to effect a substantially uniform amount of reduction in the pressure restored in the brake cylinder following any given slipping cycle relative to that obtaining prior thereto.

37. In a fluid pressure brake control apparatus for railway cars and trains of the type having means under the control of the operator for effecting service applications and emergency applications of the brakes, the combination of means operative in response to slipping of a wheel on a car or train due to either a service or an emergency application of the brakes for effecting a reduction in the degree of application of the brakes associated with said wheel and a subsequent increase in the degree of application of the brakes associated with said wheel, reapplication control means variously conditionable in accordance with the degree of a control force for correspondingly limiting the degree of reapplication of the brakes, and means responsive to each of a plurality of successive slipping cycles of said wheel during either a service or an emergency application of the brakes for varying the degree of the control force conditioning the reapplication control means by a substantially uniform amount so as to cause the reapplication control means to correspondingly limit the degree of reapplication of the brakes.

CLAUDE M. HINES.